United States Patent
Shibahara et al.

(10) Patent No.: US 10,356,183 B2
(45) Date of Patent: Jul. 16, 2019

(54) METHOD FOR SHARING PHOTOGRAPHED IMAGES BETWEEN USERS

(71) Applicant: Panasonic Intellectual Property Management Co., Ltd., Osaka (JP)

(72) Inventors: Youji Shibahara, Tokyo (JP); Toshiyasu Sugio, Osaka (JP); Toru Matsunobu, Osaka (JP); Yuki Maruyama, Osaka (JP); Takahiro Nishi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 15/340,204

(22) Filed: Nov. 1, 2016

(65) Prior Publication Data

US 2017/0048334 A1 Feb. 16, 2017

Related U.S. Application Data

(63) Continuation of application No. PCT/JP2015/002181, filed on Apr. 22, 2015.

(Continued)

(30) Foreign Application Priority Data

Dec. 16, 2014 (JP) .................. 2014-254544

(51) Int. Cl.
*G06F 15/16* (2006.01)
*H04L 29/08* (2006.01)
(Continued)

(52) U.S. Cl.
CPC ............ *H04L 67/146* (2013.01); *G06F 21/10* (2013.01); *H04L 65/1066* (2013.01);
(Continued)

(58) Field of Classification Search
CPC ....... H04L 67/146; H04L 67/12; H04L 65/00; H04N 5/247; H04N 5/265; H04N 5/2256; H04N 5/23293; H04N 5/232; G06F 21/33
(Continued)

(56) References Cited

U.S. PATENT DOCUMENTS

2003/0074373 A1* 4/2003 Kaburagi .......... G06F 17/30265
2014/0229584 A1 8/2014 Aoki et al.
(Continued)

FOREIGN PATENT DOCUMENTS

JP 2002-314994 10/2002
JP 2010-109783 5/2010
(Continued)

OTHER PUBLICATIONS

International Search Report of PCT application No. PCT/JP2015/002181 dated Aug. 4, 2015.
(Continued)

*Primary Examiner* — Frantz B Jean
(74) *Attorney, Agent, or Firm* — Greenblum & Bernstein, P.L.C.

(57) ABSTRACT

An image photographing method for sharing a shared image, which is a plurality of images obtained by photographing an identical subject 103 with a plurality of cameras or an image generated from the plurality of images, between a plurality of users of the plurality of cameras, the image photographing method including: judging whether a target camera that is one of the plurality of cameras photographs subject 103 (S401); and allowing a user of the target camera to browse the shared image according to a period in which the target camera photographs subject 103 (S403) when the judgement that the target camera photographs subject 103 is made (Yes in S402).

20 Claims, 21 Drawing Sheets

Related U.S. Application Data

(60) Provisional application No. 62/003,189, filed on May 27, 2014.

(51) Int. Cl.
| | | |
|---|---|---|
| *H04N 5/247* | (2006.01) | |
| *H04N 5/265* | (2006.01) | |
| *H04N 5/232* | (2006.01) | |
| *H04L 29/06* | (2006.01) | |
| *G06F 21/10* | (2013.01) | |
| *H04N 5/225* | (2006.01) | |

(52) U.S. Cl.
CPC ........ *H04L 65/1086* (2013.01); *H04L 67/141* (2013.01); *H04N 5/232* (2013.01); *H04N 5/23293* (2013.01); *H04N 5/247* (2013.01); *H04N 5/265* (2013.01); *H04L 67/12* (2013.01); *H04N 5/2256* (2013.01)

(58) Field of Classification Search
USPC ........................................................ 709/227
See application file for complete search history.

(56) References Cited

U.S. PATENT DOCUMENTS

| | | | |
|---|---|---|---|
| 2014/0313413 | A1 | 10/2014 | Oami et al. |
| 2017/0126907 | A1* | 5/2017 | Tamura .................. G06F 17/30 |

FOREIGN PATENT DOCUMENTS

| | | |
|---|---|---|
| JP | 2010-154261 | 7/2010 |
| JP | 2012-216885 | 11/2012 |
| WO | 2013/047071 | 4/2013 |
| WO | 2013/094115 | 6/2013 |

OTHER PUBLICATIONS

Tomokazu Sato, "Estimation of camera position and posture from moving image and its applications", Nov. 23, 2014, http://www.scienceplaza.or.jp/about/sankangaku/forum19/satou.pdf.

* cited by examiner (DURING WIDE SETTING)

(DURING ZOOM SETTING)

(DURING WIDE SETTING)

(DURING ZOOM SETTING)

METHOD FOR SHARING PHOTOGRAPHED IMAGES BETWEEN USERS

BACKGROUND

1. Technical Field

The present disclosure relates to an image photographing method for sharing a shared image between a plurality of users of a plurality of cameras, the shared image being a plurality of images obtained by photographing an identical subject with the plurality of cameras or an image generated from the plurality of images.

2. Description of the Related Art

As to a method for sharing an image (an still image and a moving image) between persons who are at a place during traveling or event participation, there is a method in which a server judges a degree of similarity of a subject or positional information indicating that the persons are near the subject to temporarily makes a shared group (PTL 1). In integrating the images from the plurality of cameras to perform construction of a virtual reality space or three-dimensional reconfiguration of the subject, it is necessary to know a positional relationship of a plurality of cameras (NPL 1). As to a method for estimating a camera position with no use of the plurality of camera images, there is a method for estimating the camera position by photographing blinking of a light emitting element with a camera (PTL 2). As to a method for correcting an imaging time deviation between cameras, there is a method for synchronizing the plurality of cameras with each other based on specific visual events such as a flash light and a door opening or closing operation in an image (PTL 3).

CITATION LIST

Patent Literatures

PTL 1: Japanese Patent No. 5271693
PTL 2: Unexamined Japanese Patent Publication No. 2002-314994
PTL 3: WO13/094115

Non-Patent Literature

NPL 1: "Position and estimation of posture of camera from moving image, and its application", http://www.science-plaza.or.jp/about/sankangaku/forum19/satou.pdf In the case that the photographed image is shared between unknown users as described in PTL 1, there is a possibility of unintentionally diffusing more than necessary.

SUMMARY

One non-limiting and exemplary embodiment provides an image photographing method and an image photographing system for being able to prevent the image from unintentionally diffusing more than necessary.

In one general aspect, the techniques disclosed here feature an image photographing method for sharing a shared image, which is a plurality of images obtained by photographing an identical subject with a plurality of cameras or an image generated from the plurality of images, between a plurality of users of the plurality of cameras, the image photographing method including: judging whether a target camera that is one of the plurality of cameras photographs the subject; and allowing a user of the target camera to browse the shared image according to a period in which the target camera photographs the subject when the judgement that the target camera photographs the subject is made.

The present disclosure can provide the image photographing method and image photographing system for being able to prevent the image from unintentionally diffusing more than necessary.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

These general or specific aspects may be implemented by a system, a method, an integrated circuit, a computer program, a recording medium such as a computer-readable CD-ROM, or any combination of the system, the method, the integrated circuit, the computer program, and the recording medium.

DETAILED DESCRIPTION

Underlying Knowledge of the Present Disclosure

Figure 1:
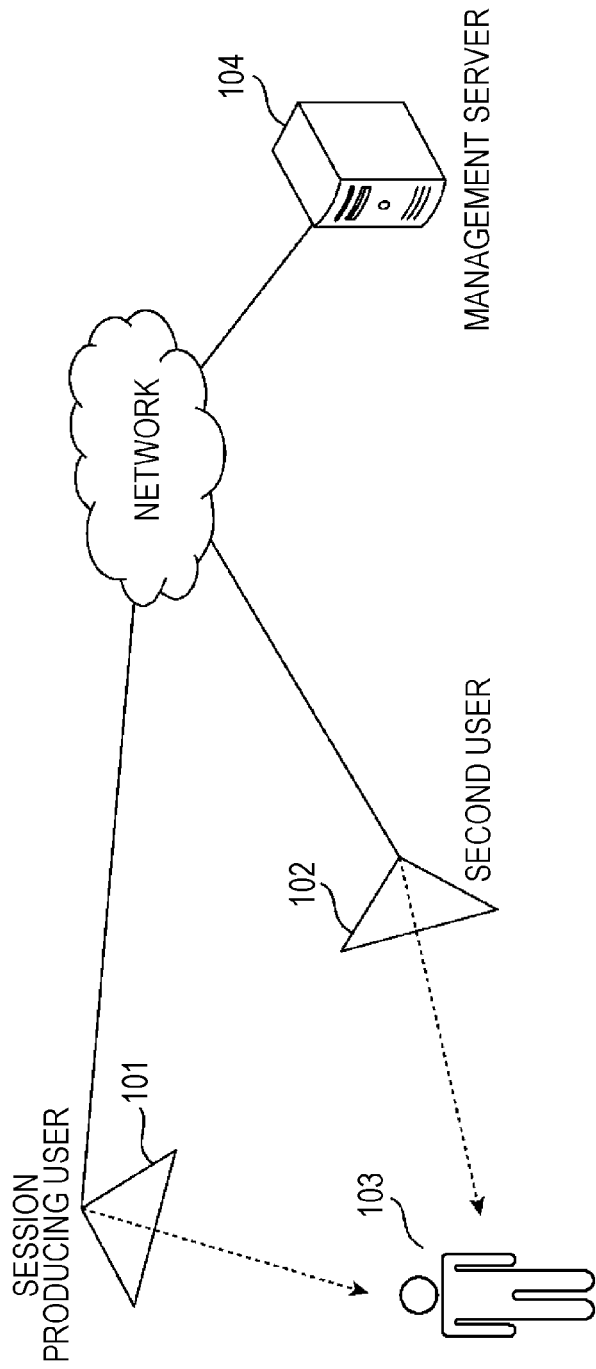
FIG. 1 is an overall configuration diagram of a first exemplary embodiment.

The inventor found that the following problems occur about the image photographing method described in "Description of the Related Art".

In the case that the photographed image is shared between unknown users as described in PTL 1, there is a possibility of unintentionally diffusing more than necessary. There is also a possibility of fostering privacy of the subject.

Processing of obtaining a correspondence between a plurality of camera images is performed in application of a virtual reality space or three-dimensional reconfiguration. At this point, information about a positional relationship (position and posture of camera) of the camera is required.

For example, a corresponding point is derived between the plurality of camera images using a feature point in the image, and the positional relationship of the camera is estimated using a derivation result. However, sometimes a position can hardly be estimated with sufficient accuracy due to a noise or the like. Additionally, there is a problem of lengthening a processing time even if the estimation can correctly be performed. In the case that the camera position is estimated with poor accuracy, or that the processing time is lengthened, the accuracy of the correspondence derivation result obtained through the processing based on camera positional relationship information is degraded, and the processing time becomes longer.

In the image photographing method and image photographing system of one general aspect of the present disclosure, unlimited photographing or the image diffusion is prevented by an authentication mechanism on the server side, and an invasion of privacy of the subject is prevented by easily presenting that the photographing is currently performed during the photographing. Additionally, in the image photographing method and image photographing system, information about camera positional relationship is used as a reference value (or an initial value of correspondence derivation processing) of correspondence derivation processing of the application by a method or means different from the conventional method or means, thereby improving the accuracy of the correspondence derivation.

In one general aspect, the techniques disclosed here feature an image photographing method for sharing a shared image, which is a plurality of images obtained by photographing an identical subject with a plurality of cameras or an image generated from the plurality of images, between a plurality of users of the plurality of cameras, the image photographing method including: judging whether a target camera that is one of the plurality of cameras photographs the subject; and allowing a user of the target camera to browse the shared image according to a period in which the target camera photographs the subject when the judgement that the target camera photographs the subject is made.

Therefore, in the image photographing method, the user who does not actually perform the photographing is prevented from browsing the shared image, so that the image can be prevented from unintentionally diffusing more than necessary.

For example, a period in which the target camera photographs the subject may be judged, and in the allowing, the user of the target camera may be allowed to browse an image photographed in the period in which the judgement that the target camera photographs the subject is made or an image generated from the image in a plurality of shared images photographed or generated in periods different from each other.

For example, a period in which the target camera photographs the subject may be judged, and in the allowing, the user of the target camera may be allowed to browse the shared image in the period in which the judgement that the target camera photographs the subject is made.

For example, in the judging, whether the target camera photographs the subject may be judged based on positional information about the target camera and based on whether the subject is taken in the image photographed with the target camera.

For example, the image photographing method may further include: authenticating participation of a new user in a session for sharing the shared image, performing an event in which the new user is detectable with a camera of an already-participated user who already participates in the session, and estimating a position of the new user based on a position of the already-participated user and the event detected with the camera of the already-participated user.

Therefore, in the image photographing method, the position of the new user can easily be estimated.

For example, the event may be flash light emitted with a camera of the new user.

For example, the event may be specific action performed by the new user.

For example, the image photographing method may further include: generating a session with a first camera in order to share the shared image; sending a session information about the session from the first camera to a server; and sending the session information from the server to a second camera.

Therefore, in the image photographing method, another user can be notified that the session is produced.

For example, in sending the session information from the server to a second camera, the server may extract the second camera located near the first camera from a plurality of cameras.

In one general aspect, the techniques disclosed here feature an image photographing system that shares a shared image, which is a plurality of images obtained by photographing an identical subject with a plurality of cameras or an image generated from the plurality of images, between a plurality of users of the plurality of cameras, the image photographing system includes: a judging unit that judges whether a target camera that is one of the plurality of cameras photographs the subject; and an allowing unit that allows a user of the target camera to browse the shared image according to a period in which the target camera photographs the subject when the judgement that the target camera photographs the subject is made.

Therefore, in the image photographing system, the user who does not actually perform the photographing is prevented from browsing the shared image, so that the image can be prevented from unintentionally diffusing more than necessary.

In one general aspect, the techniques disclosed here feature a server that shares a shared image, which is a plurality of images obtained by photographing an identical subject with a plurality of cameras or an image generated from the plurality of images, between a plurality of users of the plurality of cameras, the server includes: a judging unit that judges whether a target camera that is one of the plurality of cameras photographs the subject; and an allowing unit that allows a user of the target camera to browse the shared image according to a period in which the target camera photographs the subject when the judgement that the target camera photographs the subject is made.

Therefore, in the server, the user who does not actually perform the photographing is prevented from browsing the shared image, so that the image can be prevented from unintentionally diffusing more than necessary.

In one general aspect, the techniques disclosed here feature an image photographing device included in an image photographing system, the image photographing system that shares a shared image, which is a plurality of images obtained by photographing an identical subject with a plurality of cameras or an image generated from the plurality of images, between a plurality of users of the plurality of cameras, the image photographing device includes: a target camera that is one of the plurality of cameras; a display that displays the shared image; and a storage in which the shared image is stored for at least a temporary time. When the judgement that the target camera photographs the subject is made, the shared image is externally received only in a browsing allowable period of the shared image, the browsing allowable period being set according to the period in which the target camera photographs the subject, and the received shared image is stored in the storage.

Therefore, in the image photographing device, the user who does not actually perform the photographing is prevented from browsing the shared image, so that the image can be prevented from unintentionally diffusing more than necessary.

These comprehensive or specific aspects may be implemented by a system, a method, an integrated circuit, a computer program, a recording medium such as a computer-readable CD-ROM, or any combination of the system, the method, the integrated circuit, the computer program, and the recording medium.

Hereinafter, exemplary embodiments will be described with reference to the drawings.

The following exemplary embodiments illustrate specific examples of the present disclosure. The following numerical values, shapes, materials, constituents, displacement positions and a connection mode of the constituents, steps, and step order of the exemplary embodiments are illustrated only by way of example, but the present disclosure is not limited to the numerical values, shapes, materials, constituents, displacement positions and a connection mode of the constituents, steps, and step order. In the following constituents of the exemplary embodiments, the constituent that is not described in the independent claim indicating the highest concept is described as any constituent.

First Exemplary Embodiment

A first exemplary embodiment is roughly divided into a session participation method and a camera calibration method. The session participation method and the camera calibration method will sequentially be described below.

It is necessary to pay particular attention to an invasion of privacy or an infringement of a portrait right in the case that virtual reality or three-dimensional reconfiguration is applied using images of a plurality of cameras of an unspecified large number of users (particularly almost at first sight). Although what kind of photographing is allowed depends on a situation during the photographing, a method in which the same use as the photographing with the single digital camera or smartphone is allowable is required during the photographing with the plurality of cameras.

In the case that the image (including a still image and a moving image) is shared, or that the virtual reality generated based on the image or a content three-dimensionally reconfigured based on the image is shared, a group sharing the image, the virtual reality, and the content is generated. These groups are referred to as a session.

First, an image photographing system of the first exemplary embodiment will be described. FIG. 1 is a view illustrating a configuration of the image photographing system of the first exemplary embodiment. Image photographing system 100 in FIG. 1 includes camera 101 of a session producing user, camera 102 of a user who participates in the session, and management server 104.

Cameras 101 and 102 are not limited to cameras such as a digital still camera or a digital video camera, but may be terminals, such as a smartphone or a portable terminal, in which the camera is incorporated.

Cameras 101 and 102 are connected to management server 104 through a network. Cameras 101 and 102 are located near subject 103 to photograph subject 103. Subject 103 is not limited to a person or an object, but may be specific scenes such as a sports meeting.

Although cameras 101 and 102 are illustrated in FIG. 1 for convenience, at least three cameras may be provided.

Figure 2:
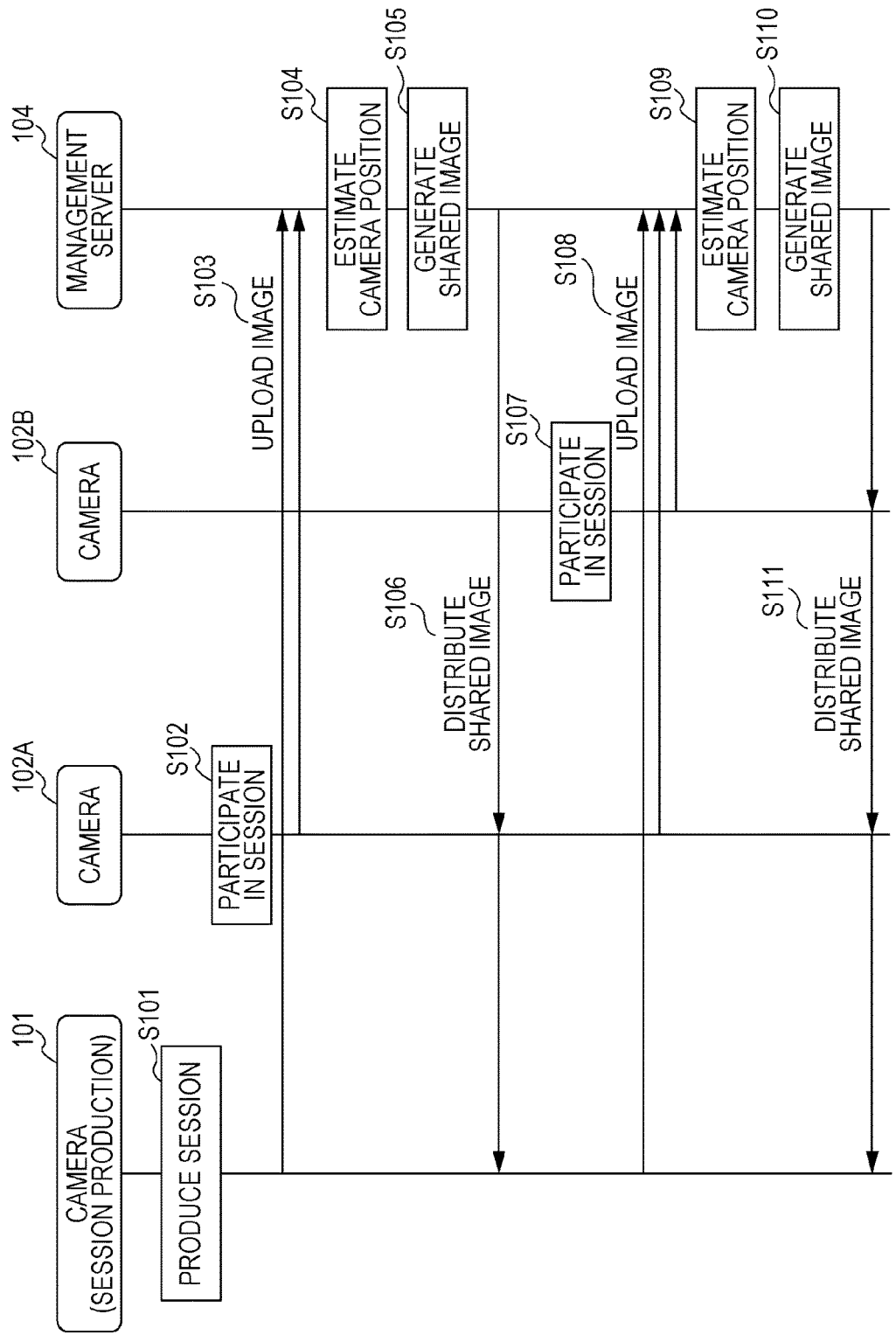
FIG. 2 is a sequence diagram illustrating an image photographing method of the first exemplary embodiment.

An overall flow of image photographing processing performed with the image photographing system will be described below. FIG. 2 is a view illustrating the overall flow of the image photographing processing of the first exemplary embodiment. Operation in the case that cameras 101, 102A, and 102B exist near subject 103 will be described below.

Camera 101 produces the session (S101). Then, camera 102A participates in the produced session (S102). Cameras 101 and 102 participating in the session photograph subject 103, and uploads obtained images (the still image or the moving image) to management server 104 (S103).

Management server 104 estimates the positions and orientations of the cameras using the uploaded images and pieces of positional information sent from the cameras (S104). For example, management server 104 derives a corresponding point between the plurality of camera images using a feature point in the image, and estimates the position or orientation of each camera using a derivation result.

Then, management server 104 generates a shared image using the estimated position and orientation of each camera and the uploaded image (S105). As used herein, the shared image means the virtual reality generated using the uploaded image or the content three-dimensionally reconfigured using the uploaded image.

The shared image is not limited to the image (content) generated using the uploaded image, but may be the uploaded image (still image or moving image) itself.

Management server 104 distributes the generated shared image to cameras 101 and 102A participating in the session (S106).

At this point, camera 102B newly participates in the session (S107). Then, similarly cameras 101, 102A, and 102B photograph subject 103, and upload the obtained image to management server 104 (S108). Management server 104 estimates the position and orientation of newly-added camera 102B using the image uploaded from each camera and the positional information sent from camera 102B (S109). The detailed processing in S109 will be described in second and third exemplary embodiments.

Then, management server 104 generates the shared image using the estimated position and orientation of each camera and the uploaded image (S110). Management server 104 distributes the generated shared image to cameras 101, 102A, and 102B participating in the session (S111).

Figure 3:
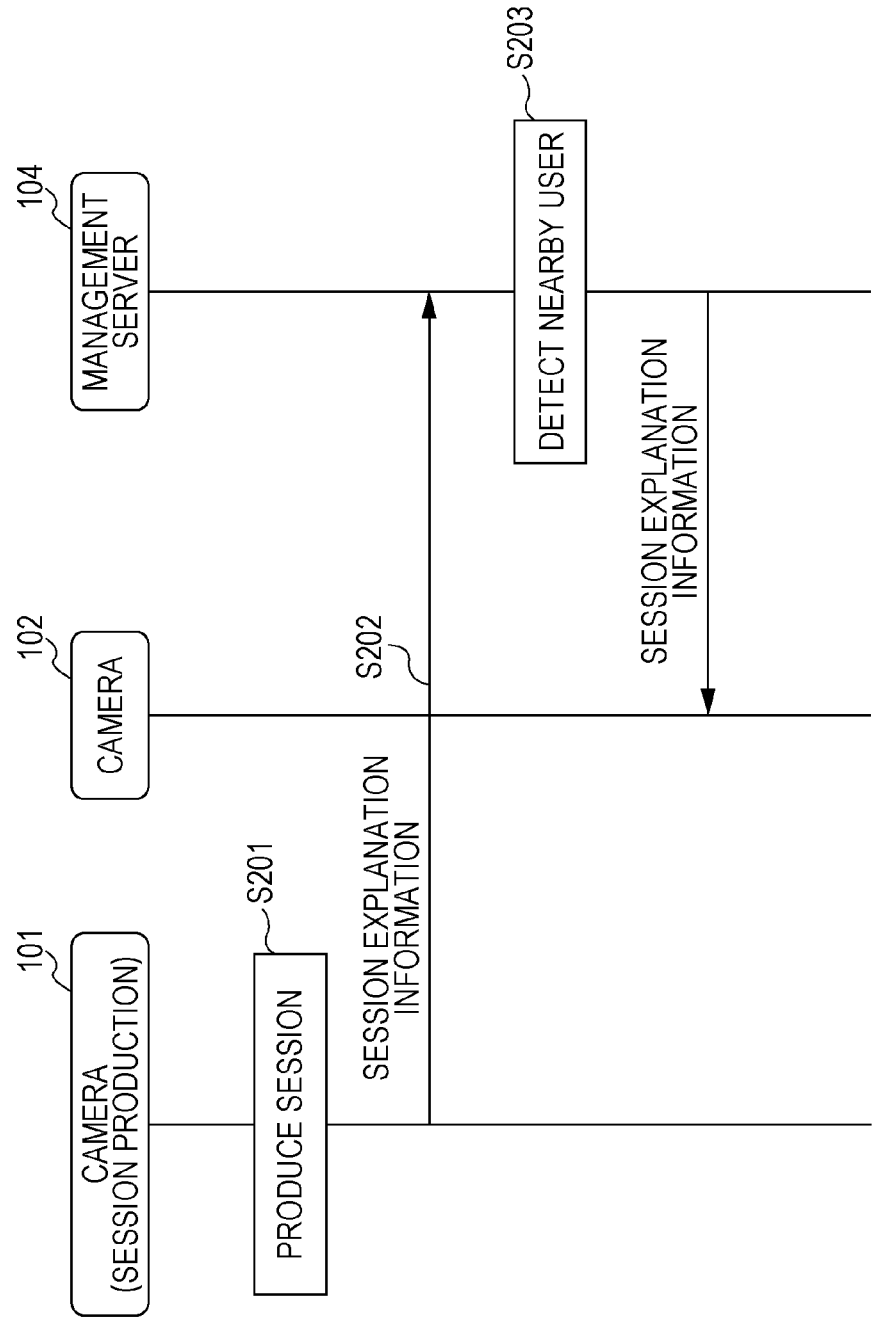
FIG. 3 is a sequence diagram illustrating session generating processing of the first exemplary embodiment.

The session generating processing (S101 in FIG. 2) will be described below. For example, it is assumed that software (application program) corresponding to the session generating processing is previously installed in the device. FIG. 3 is a view illustrating a flow of the session generating processing.

According to operation of a session producing user of a user who wants to start the session, camera 101 starts the software to perform "session production" (S201).

Then, camera 101 produces session explanation information according to the operation of the session producing user. The session explanation information means characters indicating an object to be photographed or a zoom-out image of the image in which subject 103 is photographed. Camera 101 (the software) sends the produced session explanation information to management server 104 (S202).

Management server 104 detects a camera in which the corresponding software is installed, the camera existing near subject 103 to be able to photograph subject 103, and notifies the camera that the session is generated (S203). A user who is different from the session producing user is referred to as a second user.

Management server 104 specifies notification target camera (terminal) by, for example, the following method.

Management server 104 receives positional information of a Global Positioning System (GPS), positional information of a 3G/LTE base station, or positional information of a WiFi (registered trademark) access point from the plurality of cameras, extracts another camera existing within a predetermined distance from the position of camera 101 based on the received positional information, and sends the session explanation information to the extracted camera (participation condition 1). Because sometimes another camera or the same subject is taken in the image photographed with each of the plurality of cameras, management server 104 can calculate the positional information about each camera by performing image processing such as feature point matching on the image photographed with each of the plurality of cameras. Thus, management server 104 may extract another camera existing within the predetermined distance from the position of camera 101 based on the positional information calculated through the image processing performed on the photographed image. Management server 104 may judge the position using both the positional information and the photographed image.

Otherwise, management server 104 sends the session explanation information to another camera in which the corresponding software is installed, the camera conducting short-range communication (such as Near Field Communication (NFC), BlueTooth (registered trademark), and WiFi) with camera 101 (participation condition 2). Specifically, management server 104 issues a session identifying specific code, and sends the specific code to (the software of) camera 101. As used herein, the specific code means a randomly-generated code such as a character string and a numeric string, and a unique key linked to the session.

Camera 101 sends its specific code to camera 102 by short-range communication. (The software of) camera 102 receives the specific code, and sends the specific code to management server 104. When the specific code unique to the session is received through camera 102, management server 104 judges that camera 102 exists near camera 101.

Otherwise, camera 101 validly sets WiFi access point service, and notifies management server 104 of an Service Set Identifier (SSID) of an access point detected by camera 101. On the other hand, (the software of) camera 102 periodically sends a list of the SSID of the access point detected by camera 102 to management server 104. When the SSID matched with the SSID of which camera 101 notifies management server 104 is included list sent from camera 102, management server 104 judges that camera 102 exists near camera 101, and notifies camera 102 of the session explanation information (participation condition 3). Otherwise, management server 104 notifies camera 102 of the existence of the session by constructing the WiFi access point of the SSID including a specific character string.

Otherwise, a display device of camera 101 displays a session participating unique key (such as a passcode and a URL) using a QR code or the character string. The session participation may be applied in the case that camera 102 reads the displayed unique key (participation condition 4).

Otherwise, camera 101 blinks a flash photographing LED provided in a rear surface of camera 101 with a specific pattern. Camera 102 reads the blinking pattern of the LED, and sends the read pattern to management server 104. When checking that the pattern sent from camera 102 is matched with the blinking pattern of the LED of camera 101, management server 104 judges that camera 102 exists near camera 101, and notifies camera 102 of the session explanation information (participation condition 5). As used herein, the rear surface of the camera means an opposite side to the side on which the user is located during the photographing, and means a subject side (a side on which a camera lens is provided).

The judgement whether the session notification is made may be an OR condition or an AND condition in which a plurality of judgements of the participation conditions 1 to 5 are combined.

Not only the session notification is made during the new generation, but also the session notification may periodically be made. Camera 101 may periodically make the session notification, or management server 104 may periodically make the session notification.

Figure 4:
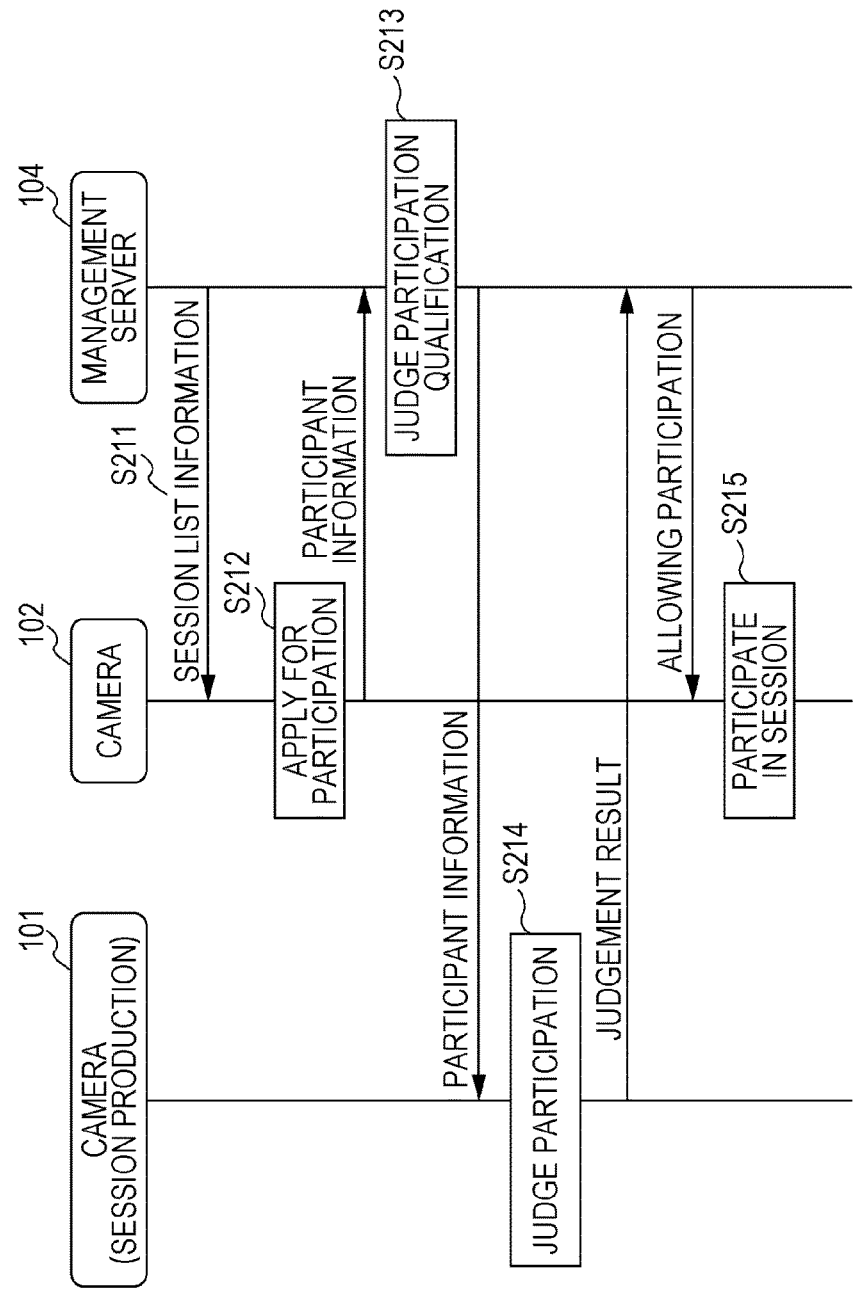
FIG. 4 is a sequence diagram illustrating session participation processing of the first exemplary embodiment.

The session participation processing (S102 in FIG. 2) will be described below. FIG. 4 is a view illustrating a flow of the session participation processing.

First, camera 102 receives the session list information from management server 104, and displays the session list information as a participatable session list (S211). The session list information is produced based on the pieces of session explanation information sent from the plurality of cameras.

In the case that the second user wishes to participate in the session, the second user performs the operation to select the session in which the second user wants to participate on camera 102. For example, the second user performs the operation to press a button "participate" or the like. The user, who intends to participate in the session but does not participate in the session yet, is referred to as a participation applicant user.

Management server 104 and camera 101 are notified of the participation intension of the participation applicant user together with participant information (such as a name and a face thumbnail) indicating a simple identity of the participation applicant user (S212). Management server 104 and the session producing user judges whether the participation of the participation applicant user in the session is allowed (S213 and S214). When the participation of the participation applicant user in the session is allowed, the participation applicant user participates in the session (S215). When the participation of the participation applicant user in the session is not allowed, camera 102 is notified that the participation of the participation applicant user in the session is not allowed.

Example of allowing judged with management server 104 (S213) include checking of payment in accounting service, login authentication in free member service, and filtering for not providing service to a specific user due to a criminal record. When judging that the participation of the participation applicant user in the session is not allowed, management server 104 may previously notify the participation applicant user that the participation applicant user is ineligible to participate in the session as incidental information when the participation applicant user is notified of the session.

Allowing judged by the session producing user (S214) means the judgement that is individually made by the session producing user from a name of the participation applicant user and the like. For example, the session producing user operates camera 101 to send a judgement result. Alternatively, the session producing user may previously set to allow all the participation applicant users without performing the judgement processing.

In FIG. 4, the participant information is sent to camera 101 through management server 104. However, the participant information needs not to be sent through management server 104. Steps S213 and S214 may be performed in arbitrary order.

In FIG. 4, the operations of the session producing user and the participation applicant user are described by way of example. However, the similar processing can be performed in the case that the plurality of users are already participate in the session. The description will specifically be made below. The user who already participates in the session is referred to as an already-participated user including the session producing user, and the camera (terminal) of the already-participated user is referred to as an already-participated camera.

The camera existing within a predetermined distance from an average position or a gravity center of the pieces of positional information about the plurality of already-participated cameras or the position of subject 103, which is derived for the purpose of the virtual reality or three-dimensional reconfiguration, may be notified of the session explanation information (derivation of participation condition 1).

The camera that currently conducts the short-range communication with one of the already-participated cameras may be notified of the session explanation information. The camera that currently conducts the short-range communication with the plurality of cameras in the already-participated cameras may be notified of the session explanation information (derivation of participation condition 2).

All the already-participated cameras may notify management server 104 of the SSID at the WiFi access point detected themselves, and notify the second user of the session explanation information in the case that the SSIDs of the plurality of already-participated users are included in the SSID reception list sent from camera 102 (derivation of participation condition 3).

Otherwise, the display device of one of the already-participated cameras displays the session participating unique key (such as a passcode and a URL) using the QR code or the character string. The session participation may be applied in the case that camera 102 reads the displayed unique key (derivation of participation condition 4).

Otherwise, one of the already-participated cameras blinks the flash photographing LED provided in the rear surface of the camera with the specific pattern. Camera 102 reads the blinking pattern of the LED, and sends the read pattern to management server 104. When checking that the pattern sent from camera 102 is matched with the blinking pattern of the LED of the already-participated camera, management server 104 judges that camera 102 exists near the already-participated camera, and notifies camera 102 of the session explanation information (derivation of participation condition 5).

In the case that the plurality of already-participated cameras exist, camera 102 may be notified of the session explanation information not only when one of the cameras satisfies the condition but also when the plurality of cameras satisfy the condition. The mistaken session participation due to the noise or information leakage (sending the passcode to a remote location by email) can be suppressed.

Not only the session producing user but also all the already-participated users may be notified of the participation intention of the participation applicant user and the participant information.

Each camera may blink the flash photographing LED of the camera with the specific pattern during the photographing. Therefore, because that the camera currently takes an image is indicated around the camera, secret photography can be suppressed. Particularly, the blinking periods of the already-participated cameras participating in the same session may be synchronized with each other. Therefore, the user participating in the same session can easily be identified. The state in which the user can be identified may be achieved by not only the method in which the flash photographing LED is used but also a method in which another display device visible around the device is used.

Figure 5:
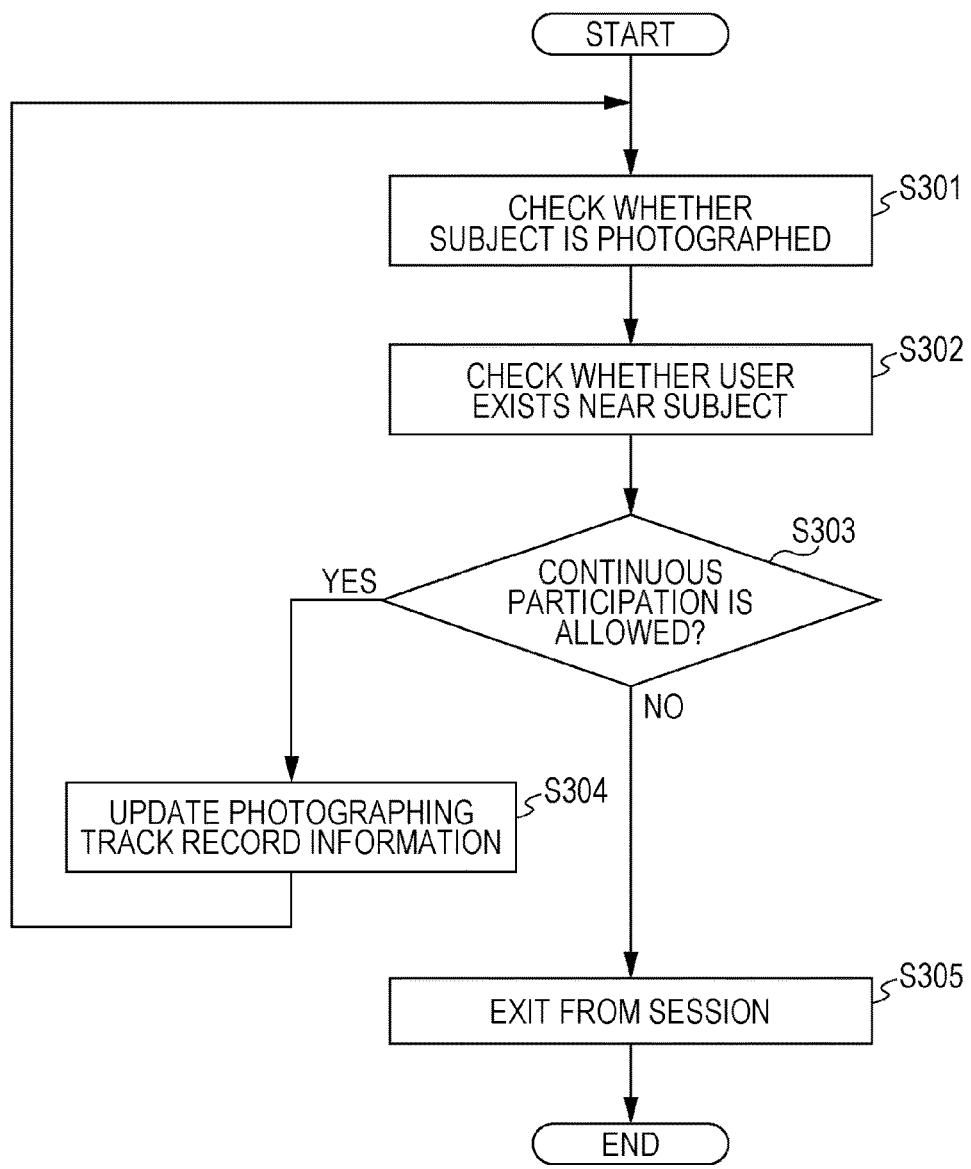
FIG. 5 is a flowchart illustrating participation qualification checking processing of the first exemplary embodiment.

Management server 104 periodically judges whether the already-participated user undoubtedly performs the photographing. FIG. 5 illustrates a flowchart of the judgement processing.

Management server 104 periodically judges whether the already-participated camera currently photographs photographing target subject 103 in the session (S301). Specifically, management server 104 calculates a degree of similarity between the image photographed with the camera (hereinafter, referred to as a target camera) of the judgement target already-participated user (hereinafter, referred to as a target user) and the image photographed with another already-participated camera. For the high degree of similarity, management server 104 judges that the target user currently photographs subject 103. Otherwise, management server 104 calculates the degree of similarity between a model three-dimensionally reconfigured from the images photographed by the plurality of already-participated users and the image photographed with the target camera. For the high degree of similarity, management server 104 judges that the target user currently photographs subject 103.

Then, management server 104 judges whether the target user (target camera) is located near subject 103 (S302). Specifically, management server 104 checks the participation condition. In addition to the target camera position, management server 104 may judge whether the target camera is oriented toward a direction of subject 103.

Management server 104 judges that the target user should be caused to exit from the session (1) when subject 103 is not photographed with the target camera over a predetermined time, (2) when the target camera does not exist near subject 103 over the predetermined time, or (3) when the target camera is not oriented toward subject 103 over the predetermined time (No in S303). Management server 104 notifies the target camera that the target user should be caused to exit from the session, and causes the target user to exit from the session (S305).

Management server 104 notifies the target user only of a warning when judging that the target user should be caused to exit from the session at a first time, and management server 104 may cause the target user to exit from the session when continuously judging that the target user should be cause to exit from the session a plurality of times.

When the continuous participation is allowed, management server 104 updates photographing track record information about the target user (S304), and performs the participation qualification checking processing (from S301) again after a predetermined time elapses. As used herein, the photographing track record information means information indicating a period (track record period) in which the target user participates in the session. At this point, the track record period may include not only the period in which the photographing is actually continued but also the photographing period that satisfies a given condition even if the photographing is partially interrupted. Examples of the given condition include the case that withdrawal or the photographing in another direction is less than a predetermined ratio and the case that a cumulative photographing period exceeds a predetermined value such as 30 minutes. Various condition settings can be considered, and it is considered that the condition to be set varies according to a photographing kind. Therefore, the participation condition may be decided according to the photographing, and derived as the track record period.

On the other hand, a right to browse or download the plurality of images photographed by the plurality of already-participated users or the content, in which the virtual reality space or three-dimensional reconfiguration generated using the images is applied, from management server 104 is given to the target user who should be cause to exit from the session for a given time in the track record period in which the target user participates in the session. In principle, a right to receive the content generated in a time period in which the target user does not participate in the session is not given to the target user. Therefore, the diffusion of the content can be suppressed more than necessary.

Figure 6:
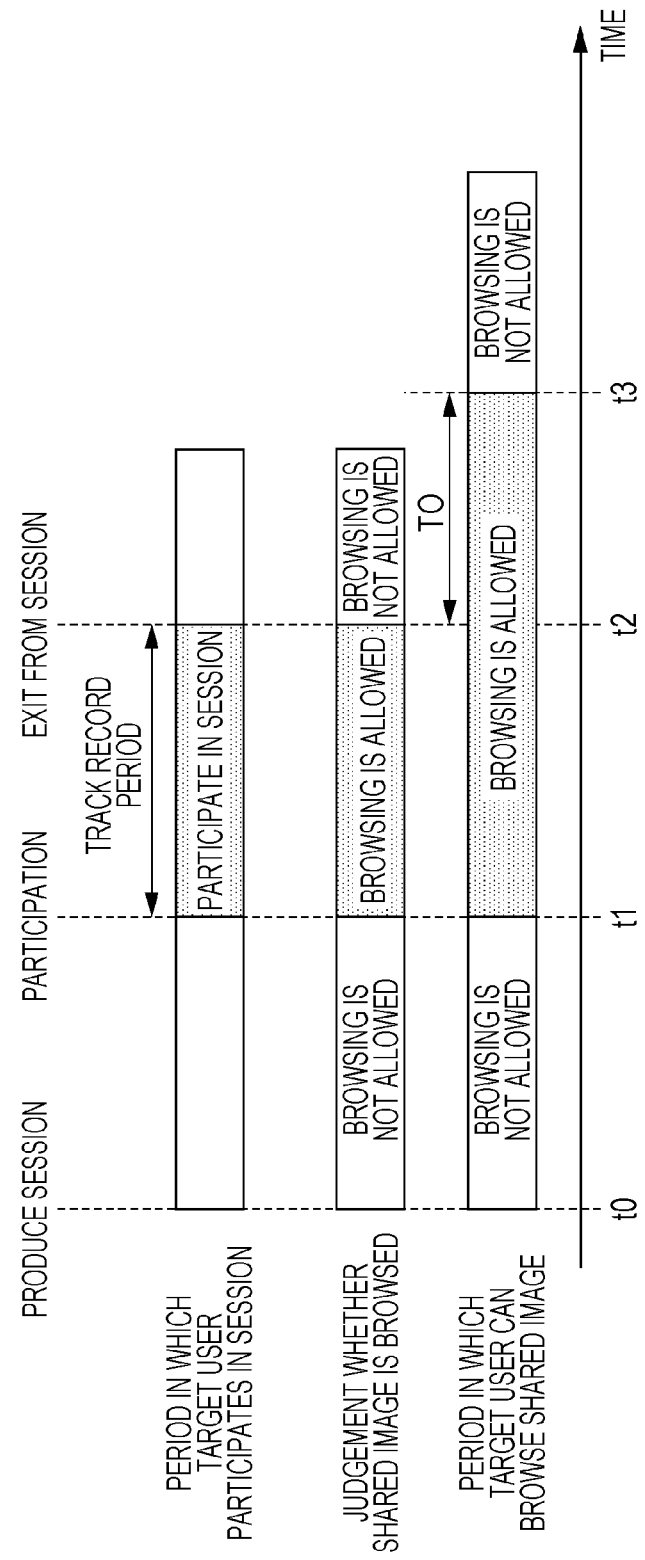
FIG. 6 is a view illustrating a shared image browsable by a user of the first exemplary embodiment.

FIG. 6 is a view illustrating examples of the shared image browsable by the target user and period in which the shared image is browsable. In the examples of FIG. 6, the target user participates in the session to perform the photographing in a period from clock time t1 to clock time t2. Management server 104 allows the target user to browse the shared image that is photographed or generated from clock time t1 to clock time t2. The target user can also browse (download) the shared image in the period from clock time t1 to clock time t2 during the session participation and period T0 (clock time t2 to clock time t3) after the session exit. In FIG. 6, period T0 is shorter than the track record period. However, period T0 is not always shorter than the track record period. Frequently period T0 is one week or one month which is much longer than the session.

The target user may be allowed to browse (download) the plurality of images photographed by the plurality of already-participated users or an image generated using the plurality of images (the content in which the virtual reality space or three-dimensional reconfiguration is applied) only in the period in which the target user participates in the session. The images, which is photographed in the period except for the track record period while corresponding in the past from the session start to the session participation in the future after the session exit, or the image in the whole period from the session start to the session end may be browsed (downloaded) when the track record period becomes greater than or equal to a predetermined time.

Figure 7:
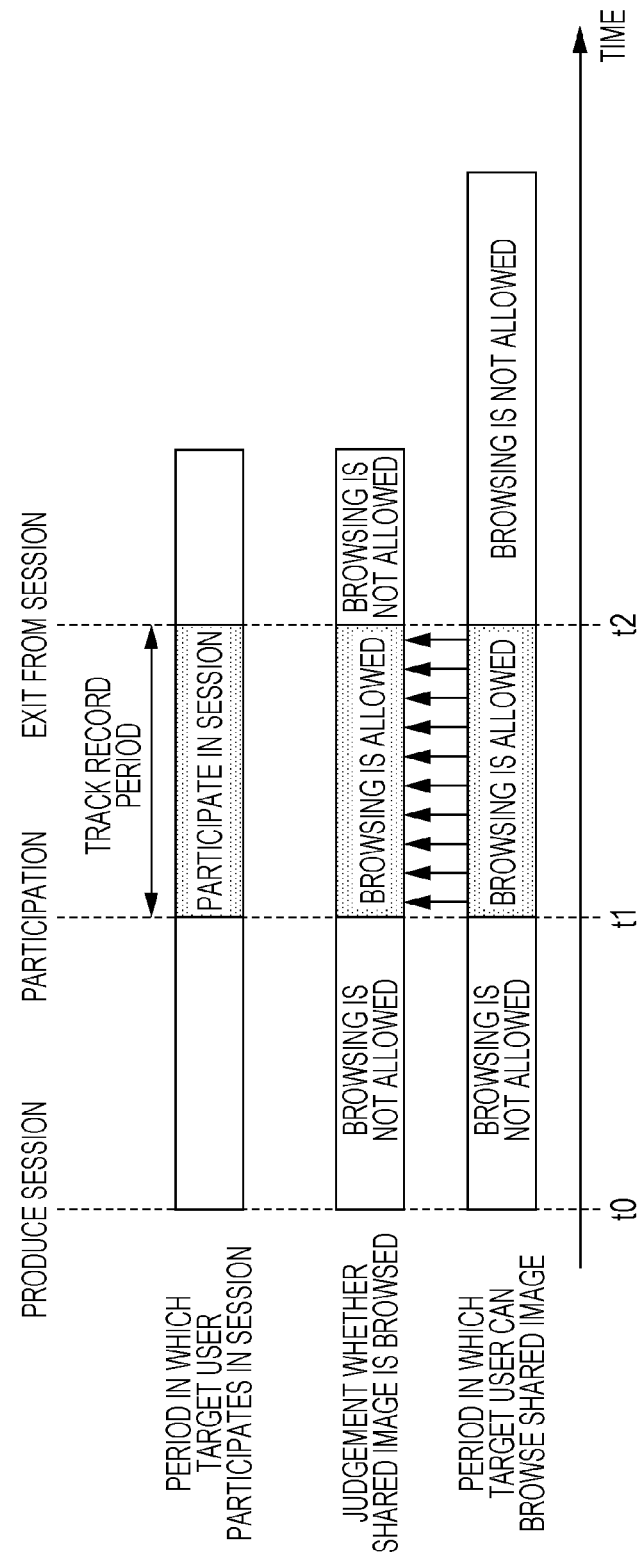
FIG. 7 is a view illustrating another example of the shared image browsable by the user of the first exemplary embodiment.

For example, in the example of FIG. 7, only when participating in the session, the target user can browse only the shared image photographed or generated at that clock time, but not browse the shared image photographed or generated in the past. That is, the target user may browse only the shared image generated in real time. For example, during the photographing performed by the target user, the image currently photographed by the target user and the image photographed by another user in real time are displayed on the terminal of the target user by screen separation.

Figure 8:
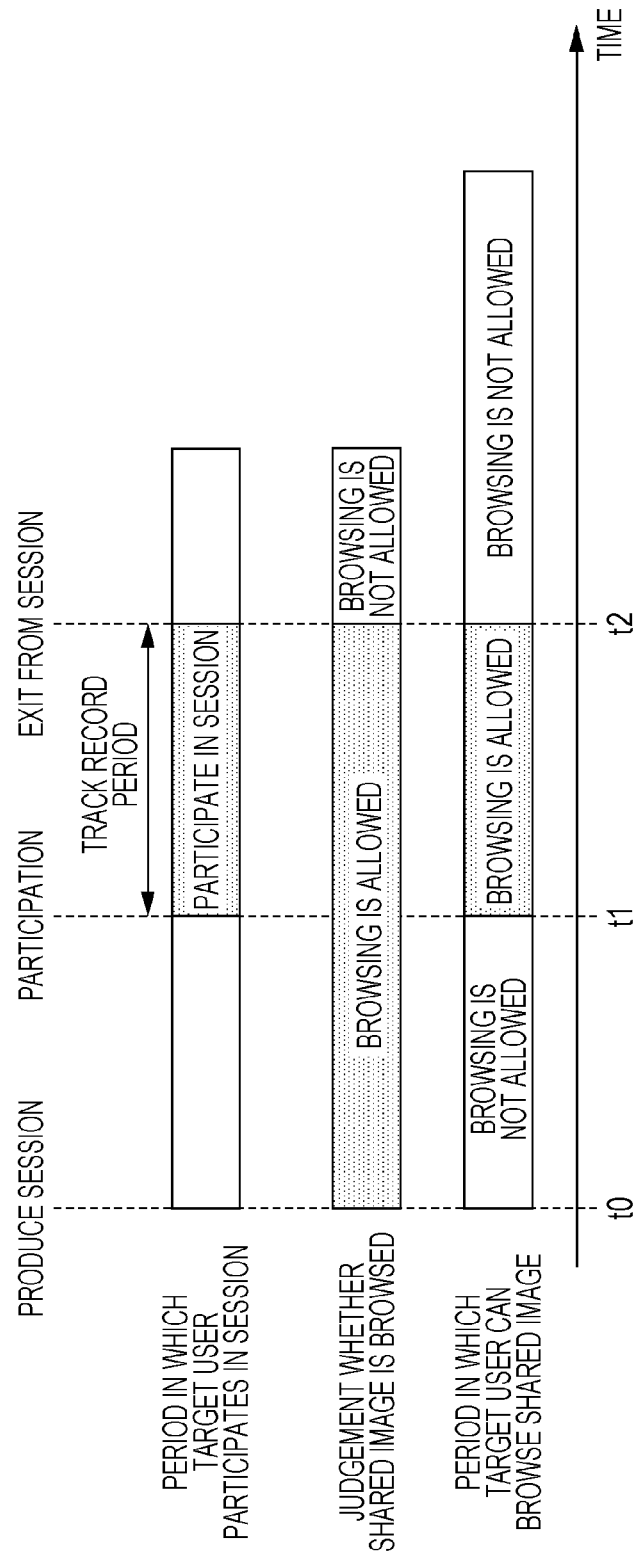
FIG. 8 is a view illustrating still another example of the shared image browsable by the user of the first exemplary embodiment.

In the example of FIG. 8, management server 104 allows the target user to browse all the images, which are photographed or generated from the session production to the period in which the target user participates in the session, in the period in which the target user participates in the session. That is, the target user can browse the image photographed by another user from the session production to the current clock time in addition to the image currently photographed by another user in real time.

In consideration of the privacy or copy right, it is obviously necessary to deal with the shared image that is browsed or downloaded as illustrated above. For example, depending on the content, it is necessary that the shared image can be browsed in a given period while not be downloaded or it is necessary that a logo of a main constituent that manages the whole system or the management server be added to the shared image.

Management server 104 periodically evaluates the participation condition of the target user (target camera), and causes the target user to exit from the session when the participation condition is not satisfied after a predetermined time elapses.

A computer having a high processing ability, a virtual computer operated on the computer, or a cloud type computer operated in a dispersion manner with the plurality of computers performs the processing that is performed to apply the virtual reality space or three-dimensional reconfiguration. Management server 104 is constructed with a similar device.

A part of the procedure performed with management server 104 may be performed on camera 101 (terminal) of the session producing user or another already-participated camera.

Figure 9:
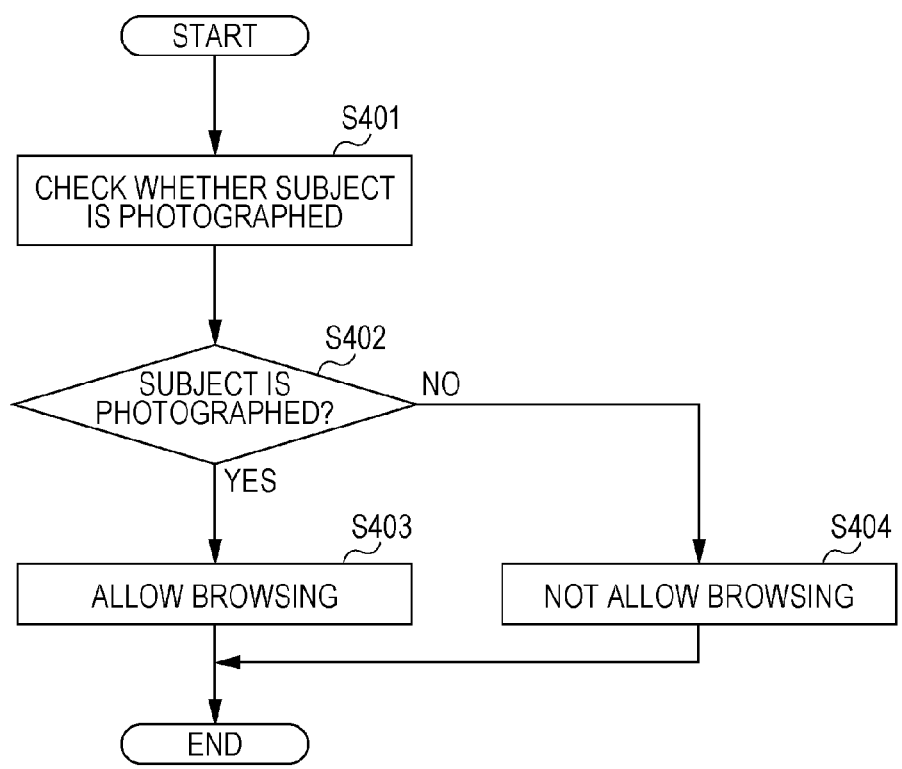
FIG. 9 is a flowchart illustrating the image photographing method of the first exemplary embodiment.

Thus, the image photographing system of the first exemplary embodiment is the system that shares the shared image between the plurality of users of the plurality of cameras, the shared image being the plurality of images obtained by photographing the identical image with the plurality of cameras or the image generated from the plurality of images, and the image photographing system perform processing in FIG. 9.

The image photographing system judges whether the target camera that is one of the plurality of cameras photographs subject 103 (S401). Specifically, the image photographing system judges whether the target camera photographs subject 103 based on the positional information about the target camera and whether subject 103 is taken in the image photographed with the target camera. More specifically, the image photographing system judges whether the target camera photographs subject 103 when the target camera is positioned near subject 103 or another camera participating in the session and when subject 103 is taken in the image photographed with the target camera.

When judging that the target camera photographs subject 103 (Yes in S402), the image photographing system allows the user of the target camera to browse the shared image according to the period in which the target camera photographs subject 103 (S403).

On the other hand, when judging that the target camera does not photograph subject 103 (No in S402), the image photographing system does not allow the user of the target camera to browse the shared image (S404).

Specifically, as illustrated in FIG. 6, the image photographing system judges the period in which the target camera photographs subject 103, and the image photographing system allows the user of the target camera to browse the image photographed in the period in which the image photographing system judges that the target camera photographs subject 103 or the image generated from the image in the plurality of shared images photographed or generated in the periods different from each other.

Otherwise, as illustrated in FIG. 7 or 8, the image photographing system periodically judges whether the target camera photographs the subject, and the image photographing system allows the user of the target camera to browse the shared image in the period in which the image photographing system judges that the target camera photographs the subject.

When the period in which the image photographing system judges that the target camera photographs the subject is longer than a predetermined period, the image photographing system may allow the user of the target camera to browse the shared image. The photographing is interrupted after the target camera photographs the subject for a given period (X), and the target camera photographs the subject for a given period (Y) again. At this point, a total period (X+Y) may be adopted as the period in which the target camera photographs the subject.

Therefore, the image photographing system can prevent the image from unintentionally diffusing more than necessary.

In the image photographing system, as illustrated in FIG. 3, first camera 101 generates the session in order to share the shared image (S201), and first camera 101 sends the session explanation information (session information) about the session to management server 104 (S202). Management server 104 extracts second camera 102 positioned near first camera 101 from the plurality of cameras (S203), and sends the session explanation information to second camera 102.

Therefore, the image photographing system can notify only the camera existing near subject 103 that the session is generated.

The present disclosure may be implemented by a server included in the image photographing system or the image photographing device including the camera.

For example, the image photographing device of the first exemplary embodiment includes a target camera that is one of a plurality of cameras included in the image photographing system, a display that displays the shared image, and a storage in which the shared image is temporarily stored for at least a given time. For the judgement that the target camera photographs the subject target camera, the shared image is externally received only in a period in which the browsing of the shared image is allowable, and the received shared image is stored in the storage, the period being set according the period in which the subject is photographed.

Second Exemplary Embodiment

In a second exemplary embodiment, calibration operation performed on an already-participated user (hereinafter, referred to as an additional user) immediately after the session participation (S109 in FIG. 2) will be described.

In the case that the content in which virtual reality space or three-dimensional reconfiguration is applied is generated from the plurality of images photographed with the plurality of cameras, it is necessary to obtain information (camera positional information) indicating which one of directions the already-participated camera is oriented toward. Generally, sometimes the accuracy of the positional information obtained with a GPS is limited, so not used indoor. Therefore, in the second exemplary embodiment, the following camera position estimating method.

Figure 10:
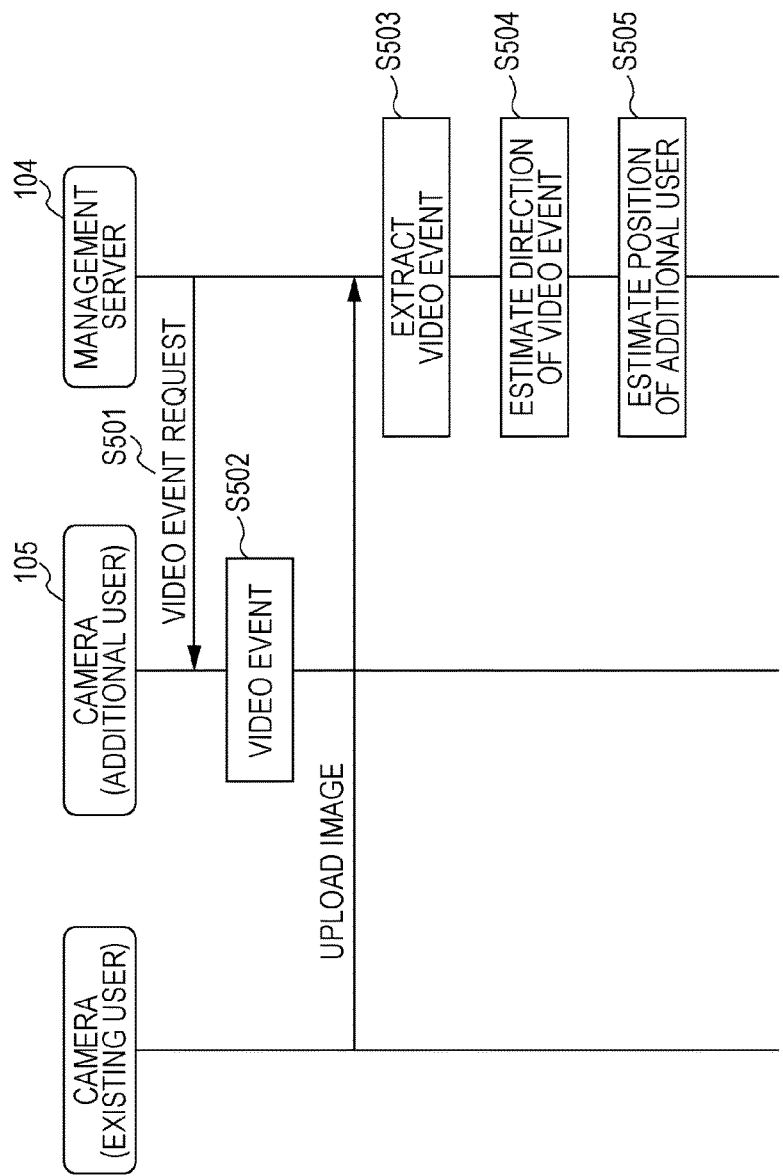
FIG. 10 is a sequence diagram illustrating additional-user camera position estimating processing according to a second exemplary embodiment.

FIG. 10 is a view illustrating a flow of position estimating processing of the second exemplary embodiment.

First, management server 104 makes a request to the additional user to generate a video event. For example, management server 104 makes the request to camera 105 of additional user to emit flash light (S501). The additional user generates the video event in response to the request. For example, camera 105 blinks the flash photographing LED provided in the rear surface of camera 105 (S502).

The user who already participates in the session (hereinafter, referred to as an existing user) currently photographs subject 103. Therefore, the camera of the existing user catches the video event (the flash light of camera 105) of the additional user who might exist around subject 103 in a certain area of the photographed image. The image photographed with the existing user's camera is continuously sent to management server 104. Management server 104 finds a video event (flash) from the image photographed in near timing of making the request of the video event (flash) to camera 105 (S503).

Then, management server 104 estimates the direction of the video event relative to the position of the existing user (S504). Specifically, in the case that the flash is taken on a right side of the screen in the image photographed with the camera of the existing user, management server 104 judges that the camera of the additional user exists in the right direction of the camera of the existing user. In the case that the flash is taken on a left side of the screen, management server 104 judges that the camera of the additional user exists in the left direction of the camera of the existing user. In the case that the flash is taken on an upper side of the screen, management server 104 judges that the camera of the additional user exists in an upper floor of a building and that the camera of the additional user exists above the camera of the existing user. In the case that the flash is taken on a lower side of the screen, management server 104 judges that the camera of the additional user exists upstairs and that the camera of the additional user exists below the camera of the existing user.

Then, management server 104 estimates the position of the camera of the additional user based on the position and orientation of the camera of existing user who photographs the image and an estimation result in the direction of the video event relative to the camera of the existing user (S505). For the use of a monocular camera, the position is roughly estimated. On the other hand, management server 104 can more surely and more finely estimate the camera position by statistically processing (for example, an average) the estimation results of the plurality of existing users.

Figure 11:
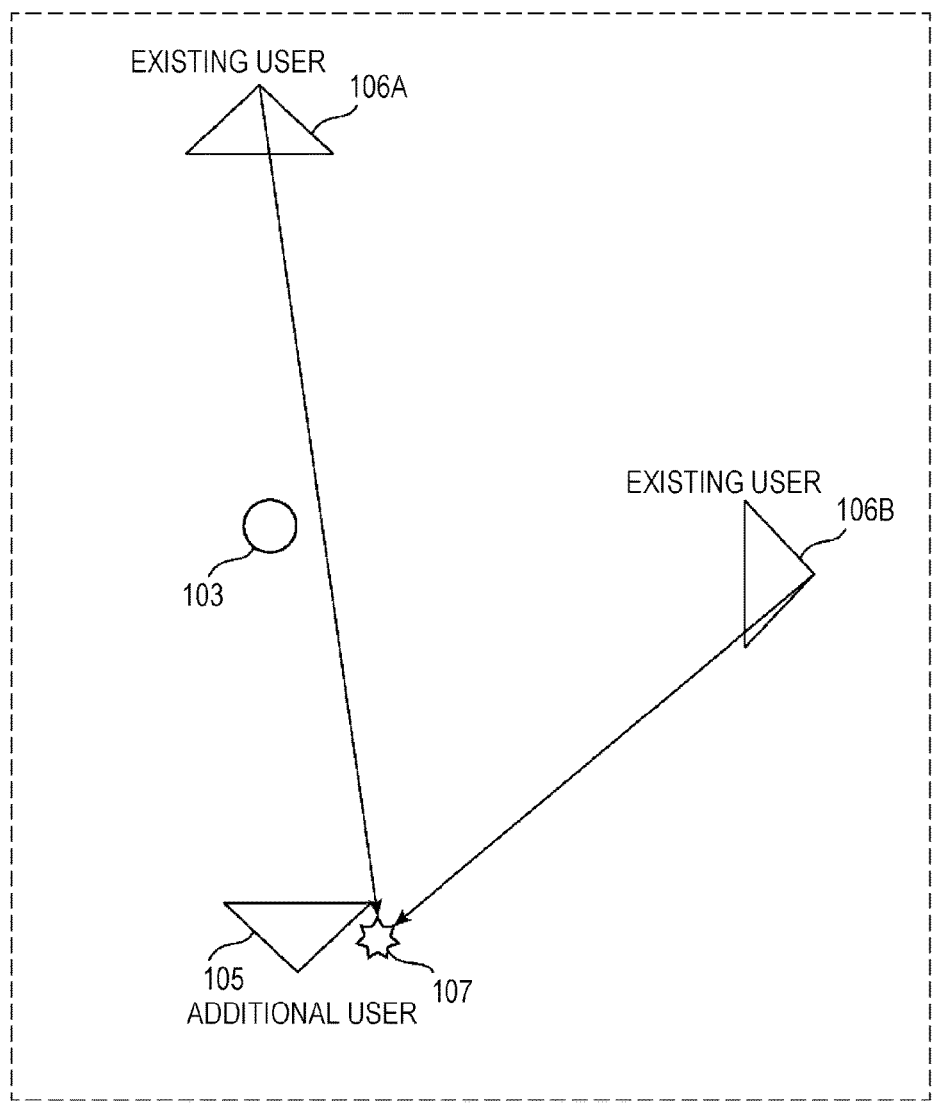
FIG. 11 is a bird's-eye view illustrating an overall configuration of the second exemplary embodiment.

An example in FIG. 11 will be described below. FIG. 11 is a conceptual diagram viewed from a zenith, and it is assumed that the north is the top of the diagram. Camera 106A of a first existing user photographs subject 103 on the north side of subject 103 positioned in the center, and camera 106B of a second existing user photographs subject 103 on the east side of subject 103. Camera 105 of the additional user is positioned on the south side of subject 103, and blinks flash 107 in response to a request from management server 104.

Figure 12:
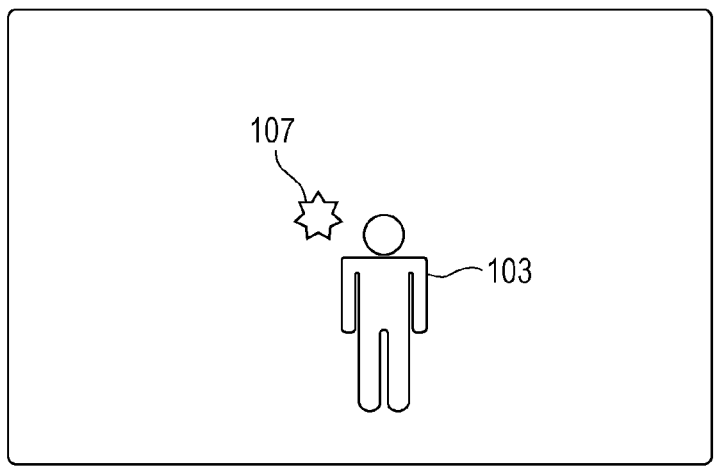
FIG. 12 is a view illustrating an example of an image photographed with an existing user camera of the second exemplary embodiment.
Figure 13:
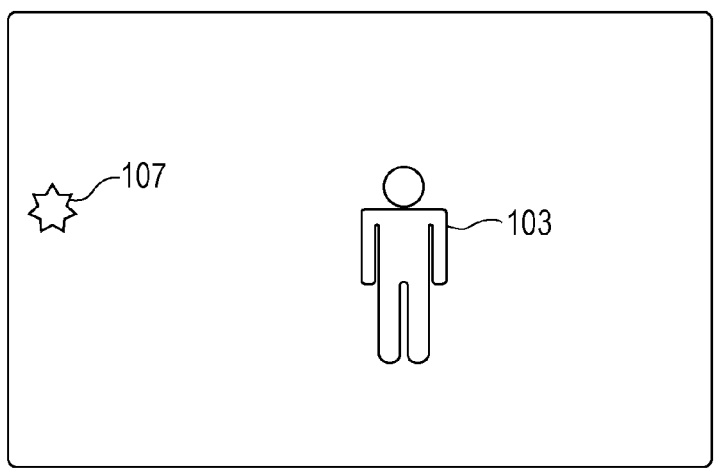
FIG. 13 is a view illustrating an example of an image photographed with an existing user camera of the second exemplary embodiment.

FIG. 12 illustrates an image photographed with camera 106A of the first existing user in this case. FIG. 13 illustrates an image photographed with camera 106B of the second existing user. As illustrated in FIG. 12, in the image photographed with camera 106A of the first existing user, subject 103 is taken in the center of the image, and flash 107 is taken beyond subject 103 (at the substantially same position in a crosswise direction). As illustrated in FIG. 13, in the image photographed with camera 106B of the second existing user, subject 103 is taken in the center of the image, and flash 107 is taken on the left side of the screen.

Because camera 105 is supposed to catch the subject once the position of the camera 105 of the additional user is detected to a certain extent, matching processing between the virtual reality space generated from the camera image of the existing user or three-dimensionally-reconfigured subject 103 and the image photographed with camera 105 is facilitated, and the accuracy is also improved. That is, using the obtained rough estimation result of the position and direction of camera 105, management server 104 performs the matching processing to estimate the correct position and direction of camera 105. Specifically, management server 104 uses the obtained rough estimation result as the reference value or initial value.

For example, management server 104 performs processing of searching the flash from the image immediately after sending a flash request signal to camera 105 of the additional user. There is a possibility of generating a delay until camera 105 actually emits the flash light since the flash request signal is received. Therefore, camera 105 notifies management server 104 of actual light emission timing when the flash is emitted, and management server 104 may search the flash light from the image photographed with the camera of the existing user in a period of time around the actual light emission timing.

The example in which the flash is used is described as an example of the video event. However, the video event may be any event as long as the event can be caught with the camera or microphone of the additional user. For example, a light emitter that emits the flash is provided in the rear surface of the terminal (camera). Alternatively, the light emitter may be an antenna-shaped light emitter provided in an upper side of the terminal. The light emitter may be a simple display device provided in the rear surface of the terminal. In this case, the simple display device displays a special video pattern as the video event.

Otherwise, camera 105 of the additional user includes a main display device in its front surface, the main display device displays the special video pattern as the video event, and the additional user may holds camera 105 such that the main display device of camera 105 is visible around. For example, camera 105 (software operating on camera 105) issues an instruction to the additional user to hold camera 105 in this manner.

As used herein, the rear surface of the terminal (camera) means the opposite side to the side on which the user is located during the photographing, and means the subject side (the side on which the camera lens is provided). As used herein, the front surface of the terminal (camera) means the side on which the user is located during the photographing, and means an opposite side to the subject side (the side on which the camera lens is provided).

The additional user may take special action (for example, raising or waving an additional user's hand) as the video event with no use of the light emitter and display device. In this case, camera 105 (software) issues an instruction to the additional user to take action as the video event.

A voice event may be used instead of the video event. For example, camera 105 of the additional user may generate sound having a specific pattern from a speaker of camera 105 as the voice event. In this case, the cameras of the plurality of existing users collect the sound with microphones of the cameras. In the case that a monaural microphone is used in the camera of the existing user, management server 104 estimates the position of camera 105 of the additional user by a triangulation technique based on intensity of sound acquired with the microphone of the cameras of the plurality of existing users. In the case that the camera of the existing user includes a stereophonic microphone, management server 104 may estimate a direction of a sound source from information obtained with the camera, and estimate the position of camera 105 by a combination of the estimation result and a sound collecting result of another existing user.

Alternatively, face recognition may be adopted instead of the video event. Specifically, management server 104 holds a face image of the additional user. Otherwise, during application of the participation, camera 105 of the additional user sends a face image of the additional user to management server 104. Management server 104 may estimate the position of the additional user (camera 105) by performing face recognition on the image photographed with the camera of the existing user using a face image retained in management server 104.

Alternatively, the cameras of the plurality of existing users sends a communication intensity of the short-range communication (such as NFC, BlueTooth, and WiFi) between the camera and camera 105 of the additional user to management server 104, and management server 104 may estimate the position of camera 105 of the additional user by the triangular technique.

Alternatively, in the case that the camera of the existing user has a distance measuring function, the camera of the existing user may measure a distance between the camera and the flash, and send a measurement result to management server 104. In this case, management server 104 uses the received measurement result to estimate the position of the additional user.

(1) For the judgement that a certain already-participated camera does not photograph subject 103, (2) for the judgement that the position of the camera does not exist near another already-participated user, or (3) for the judgement that reliability of the positional information about the camera is low, management server 104 may perform the camera position estimating processing on the already-participated camera.

When the good-visibility video event such as the flash is used, the existing user and subject easily recognize the existence of the additional user, so that a suppression effect to the secret photography and the unintentional diffusion of the photographing result can also be expected.

Thus, the image photographing system of the second exemplary embodiment authenticates the participation of the new user (additional user) in the session for sharing the shared image (S213 and S214 in FIG. 4). As illustrated in FIG. 10, the image photographing system performs the event in which the new user is detectable with the already-participated camera already participating in the session (S502), and estimates the position of the new user based on the position of the already-participated user and the event detected with the already-participated camera (S503 to S505). For example, the event means that the camera of new user emits the flash light. Otherwise, the event means that the new user performs specific action.

Therefore, the image photographing system can easily estimate the position of the new user.

Third Exemplary Embodiment

In a third exemplary embodiment, the estimation of the position of the additional user with the camera image of the existing user will be described in detail.

Figure 14:
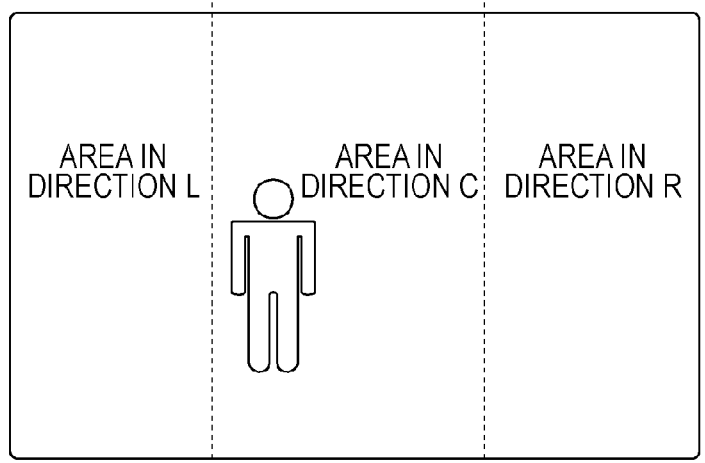
FIG. 14 is a view illustrating an example of a wide-set image according to a third exemplary embodiment.
Figure 15:
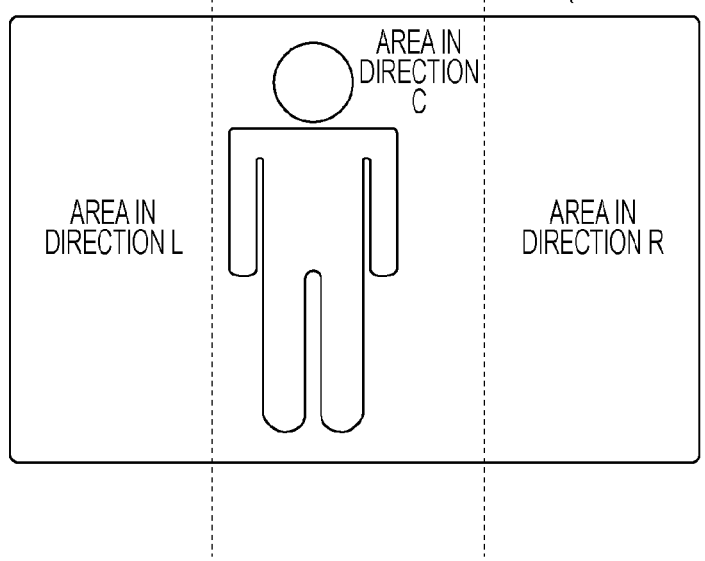
FIG. 15 is a view illustrating an example of a zoom-set image of the third exemplary embodiment.

The third exemplary embodiment will be described below with reference to FIGS. 14 to 17. FIG. 14 illustrates an example of the camera image for the wide-setting camera. FIG. 15 illustrates an example of the camera image for the zoom-setting camera.

For example, management server 104 horizontally divides the image photographed with the camera into three pieces. It is assumed that the center is an area in direction C, that the left side is an area in direction L, and that the right side is an area in direction R. Management server 104 estimates which one of the directions the video event is positioned around the camera according to the area in the image in which the video event is detected.

Figure 16:
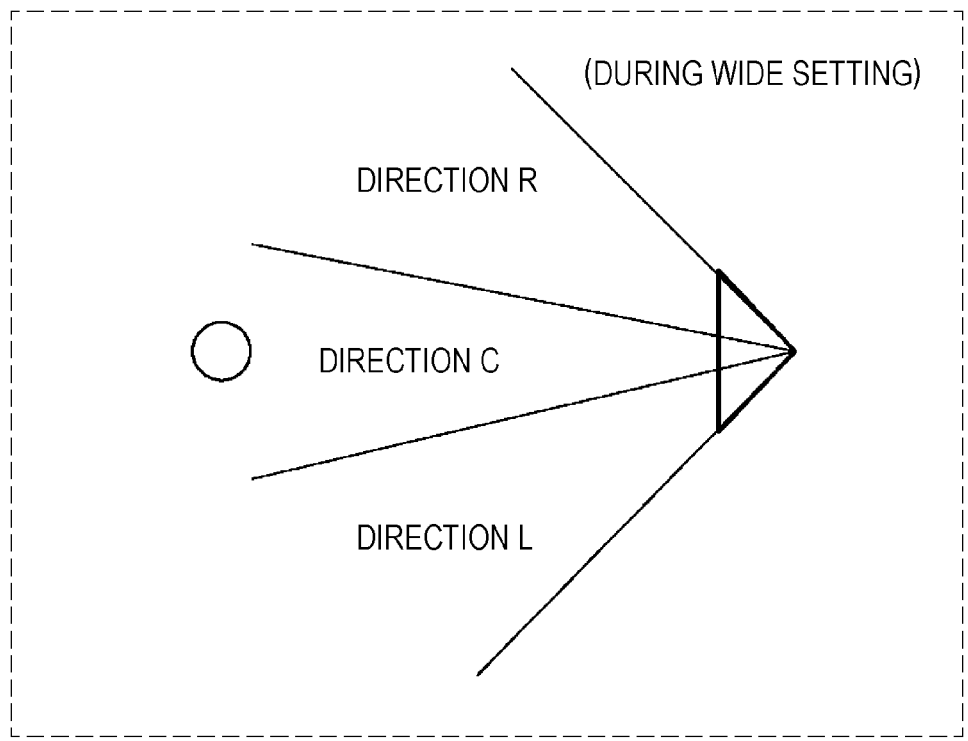
FIG. 16 is a view illustrating a direction estimated from the wide-set image of the third exemplary embodiment.
Figure 17:
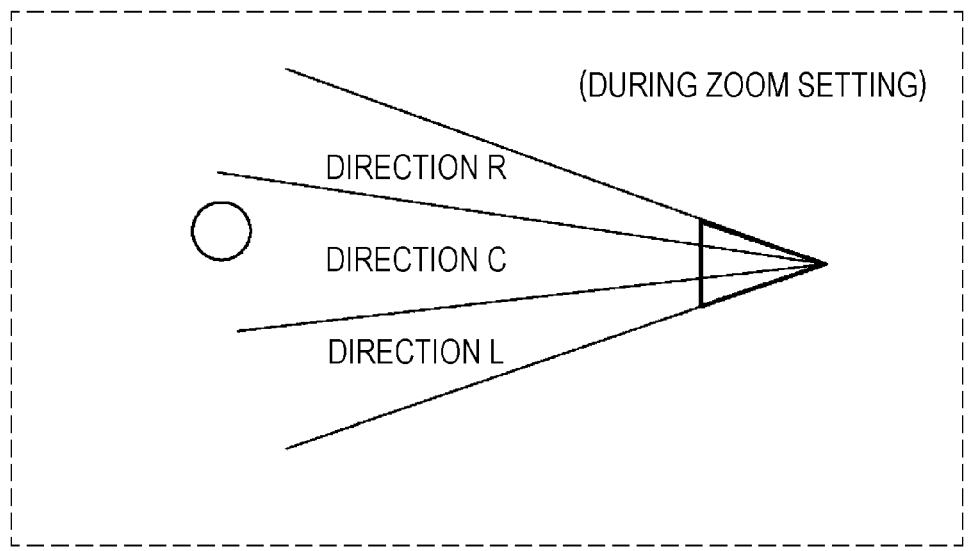
FIG. 17 is a view illustrating a direction estimated from the zoom-set image of the third exemplary embodiment.

FIGS. 16 and 17 are views illustrating a relationship among the directions corresponding to the areas. The correspondences depend on magnification and reduction, or a device characteristic of the camera. As illustrated in FIGS. 15 and 17, in the case that the camera is set to the zoom setting, management server 104 estimates that the video event occurs in one of the directions close to relatively front direction.

For example, during the upload of the image, each camera sends information indicating the magnification and reduction setting (zoom power) to management server 104. Management server 104 judges the magnification and reduction setting during the photographing of the image using the received information.

Figure 18:
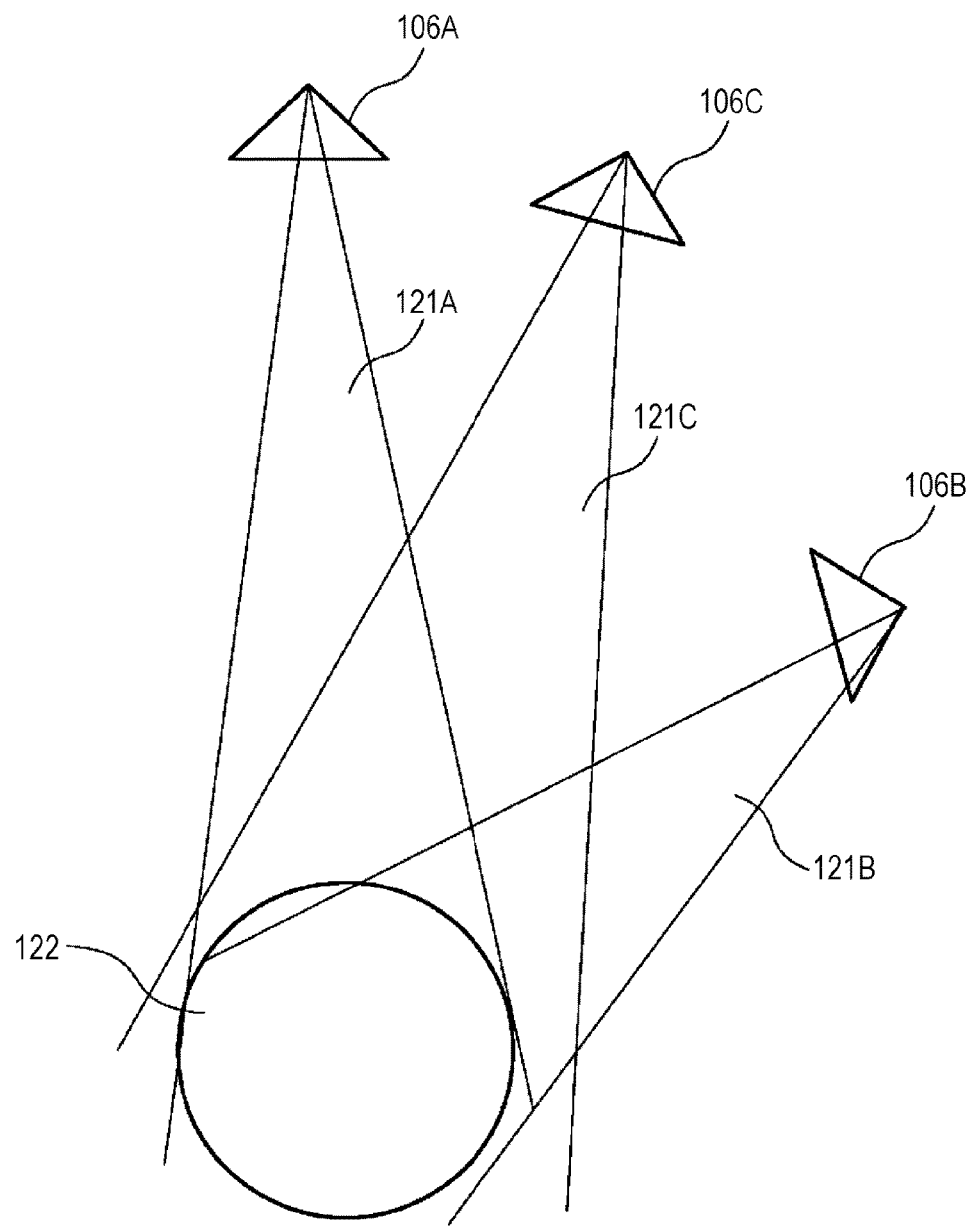
FIG. 18 is a view illustrating processing of estimating a position of an additional user from a plurality of images of the third exemplary embodiment.

FIG. 18 is a view illustrating an example of the case that three existing user cameras 106A to 106C are used. It is assumed that the pieces of positional information (the position and the posture (orientation)) about cameras 106A to 106C are known.

In the example of FIG. 18, because the flash is detected in the central area in the crosswise direction on the screen of the image photographed with camera 106A, management server 104 estimates that the camera of the additional user exists in area 121A in the front direction. Because the flash is detected in the left direction on the screen of the image photographed with camera 106B, management server 104 estimates that the camera of the additional user exists in area 121B in the left direction. Because the flash is detected in the central area in the crosswise direction on the screen of the image photographed with camera 106C, management server 104 estimates that the camera of the additional user exists in area 121C in the front direction. Management server 104 estimates that the camera of the additional user exists in area 122 where three estimated areas 121A to 121C most widely overlap one another.

Although the image photographing methods and image photographing systems of the exemplary embodiments are described above, the present disclosure is not limited to the exemplary embodiments.

Each processor of each device included in each of the image photographing systems of exemplary embodiments is typically constructed by an LSI that is of an integrated circuit. The processor may individually be formed into one chip, or some of or all the processors may be formed into one chip.

The integrated circuit is not limited to the LSI, but each processor may be constructed with a dedicated circuit or a general-purpose processor. An Field Programmable Gate Array (FPGA) that is programmable after manufacturing of the LSI or a reconfigurable processor in which the connection or setting of a circuit cell in the LSI is reconfigurable may be used.

In each of the exemplary embodiments, each constituent may be constructed with dedicated hardware or constructed by executing a software program suitable for each constituent. A program executing unit such as a CPU and a processor reads and executes the software program stored in a hard disk drive or a recording medium such as a semiconductor memory, whereby each constituent may be constructed.

In other words, each device included in the image photographing system includes a processing circuit and a storage electrically connected to the processing circuit (accessible from the processing circuit). The processing circuit includes at least one of dedicated hardware and a program executing unit. The software program executed with the program executing unit is stored in the storage in the case that the processing circuit includes the program executing unit. The processing circuit performs the predicted image generating method, the coding method, and the decoding method of the exemplary embodiments using the storage.

The present disclosure may be the software program, or a non-transient, computer-readable recording medium in which the program is stored. The program can be distributed through a transmission medium such as the Internet.

The numerical value used above is illustrated in order to specifically describe the present disclosure, but the present disclosure is not limited to the illustrated numerical value.

The order in which the steps included in the image photographing method are performed is illustrated in order to specifically describe the present disclosure, and the steps may be performed in different order. A part of the step may be performed at the same time as (in parallel with) another step.

Although the predicted image generating device, the coding device, and the decoding device according to one or a plurality of aspects of the present disclosure are described above based on the exemplary embodiments, the present disclosure is not limited to the exemplary embodiments. Various modifications can be made by those skilled in the art without departing from the scope of the present disclosure, and an aspect constructed by a combination of the constituents of the different exemplary embodiments may also be included in one or a plurality of aspects of the present disclosure.

Fourth Exemplary Embodiment

Other application examples of the configurations of the image processing method and apparatus described in each exemplary embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 19:
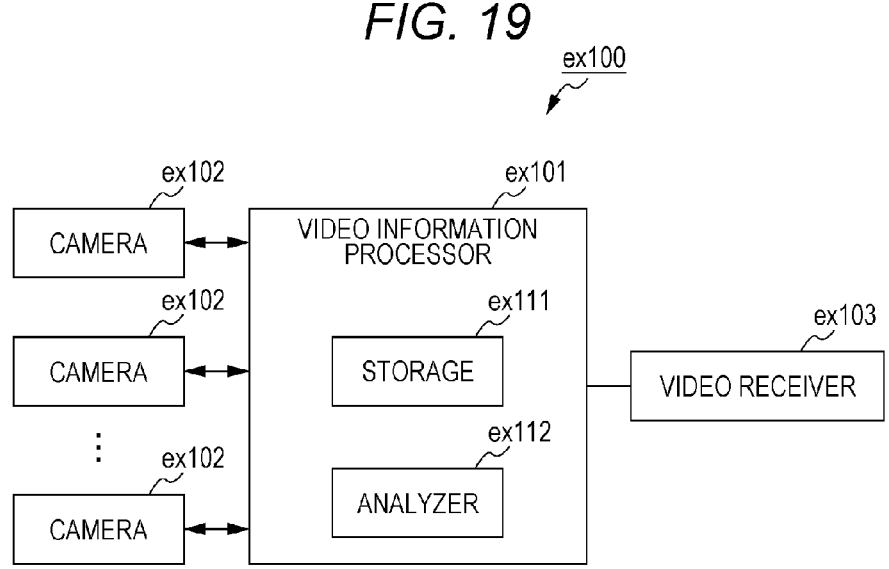
FIG. 19 is a diagram illustrating a configuration of a video information processing system.

FIG. 19 is a diagram illustrating a configuration of video information processing system ex100 according to the present exemplary embodiment. The present exemplary embodiment describes an example of preventing occurrence of a dead angle and an example of prohibiting capturing of a specific area.

Video information processing system ex100 illustrated in FIG. 19 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a dead angle from the video data stored in storage ex111, and transmits to the moving camera the instruction signal that indicates an instruction to the moving camera for preventing occurrence of a dead angle. The moving camera moves in response to the instruction signal, and continues capturing.

Analyzer ex112 detects a dead angle by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a dead angle an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a dead angle is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a dead angle by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a dead angle is highly likely to occur, based on the acquired positional relationship.

Here, the dead angle includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a dead angle even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a dead angle may be determined.

Note that detection of the area that is actually a dead angle is described above, but the area that needs to be detected in order to prevent occurrence of a dead angle is not limited to the area that is actually a dead angle. For example, when a plurality of objects to be captured exists and at least part of the objects is moving, a new dead angle is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new dead angle, based on the detected movement of the plurality of objects to be captured and positional information of camera ex102. In this case, video information processing apparatus ex101 may transmit the instruction signal to the moving camera to capture the area that is likely to become a dead angle, and video information processing apparatus ex101 may prevent occurrence of a dead angle.

Note that when there is a plurality of moving cameras, video information processing apparatus ex101 needs to select any of the moving cameras to which the instruction signal is to be transmitted in order to cause the moving camera to capture a dead angle or an area that is likely to become a dead angle. Moreover, when there is a plurality of moving cameras and there is a plurality of dead angles or areas that are likely to become dead angles, video information processing apparatus ex101 needs to determine which dead angle or area that is likely to become a dead angle each of the plurality of moving cameras is to capture. For example, video information processing apparatus ex101 selects the moving camera closest to a dead angle or an area that is likely to become a dead angle, based on a position of a dead angle or an area that is likely to become a dead angle, and a position of an area each moving camera is capturing. Moreover, video information processing apparatus ex101 may determine for each camera whether a new dead angle occurs when video data which the moving camera is currently capturing is not obtained, and video information processing apparatus ex101 may select the moving camera that is determined that a dead angle does not occur even when the video data which is currently being captured is not obtained.

The above-described configuration enables video information processing apparatus ex101 to prevent occurrence of a dead angle by detecting a dead angle and transmitting the instruction signal to the moving camera so as to prevent the dead angle.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras ex102.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described exemplary embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during halftime, video information processing apparatus ex101 may distribute a scene which the user has missed and which is considered to be important, based on the analysis result made by analyzer ex112. Moreover, video information processing apparatus ex101 may distribute the past video only when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 5. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge only when the user views the advertisement, or may provide services at a lower cost than a cost in the case where the user does not view the advertisement.

Moreover, when the user clicks "Order now" or the like in response to the advertisement, t a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras).

In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area that is moved according to the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video of the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, the user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control only any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a dead angle, only some area of the capturing areas in the captured video data is likely to be needed for filling the dead angle. In this case, camera ex102 may generate extracted video data by extracting at least only the area needed for preventing occurrence of the dead angle from the video data, and transmit the generated extracted video data to video information processing apparatus ex101. This configuration can realize suppression of occurrence of the dead angle at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit only the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present exemplary embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present exemplary embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the outline video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore only the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may preferentially restore only the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using only high-quality data, or by preferentially using high-quality data among the plurality of pieces of video data stored in storage ex111.

Variation 14

Analyzer ex112 may restore the three-dimensional shape by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 20:
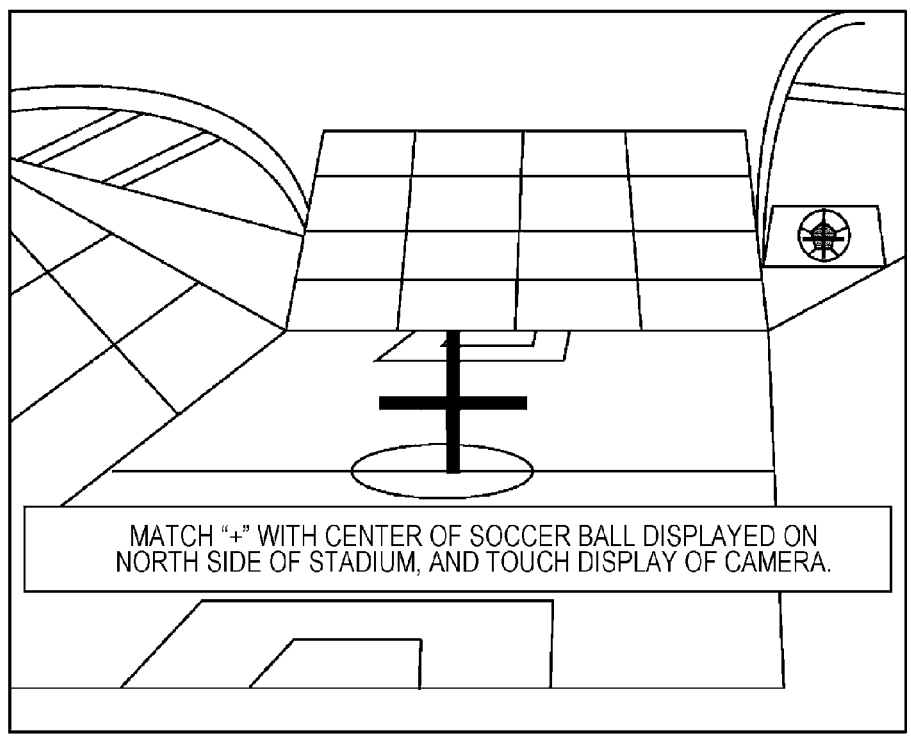
FIG. 20 is a diagram illustrating an example of a notification screen displayed when a camera is activated.

Moreover, the positional and angle information of camera ex102 is acquired by pointing camera ex102 at a specific point in the facility or in the stadium when camera ex102 is activated or at any timing. FIG. 20 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video only with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera weather and a road surface state in a direction of a destination, traffic congestion level and the like can be understood with better accuracy by using three-dimensional data modeled from a plurality of images.

Fifth Exemplary Embodiment

The processing described in each of the above-described exemplary embodiments can be carried out easily in a standalone computer system by recording a program for implementing the configuration of the image processing method described in each exemplary embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the exemplary embodiments and the systems using the application examples will be further described. The systems include an apparatus that uses the image processing method. A change in other configurations of the systems can be made appropriately in accordance with the circumstances.

Figure 21:
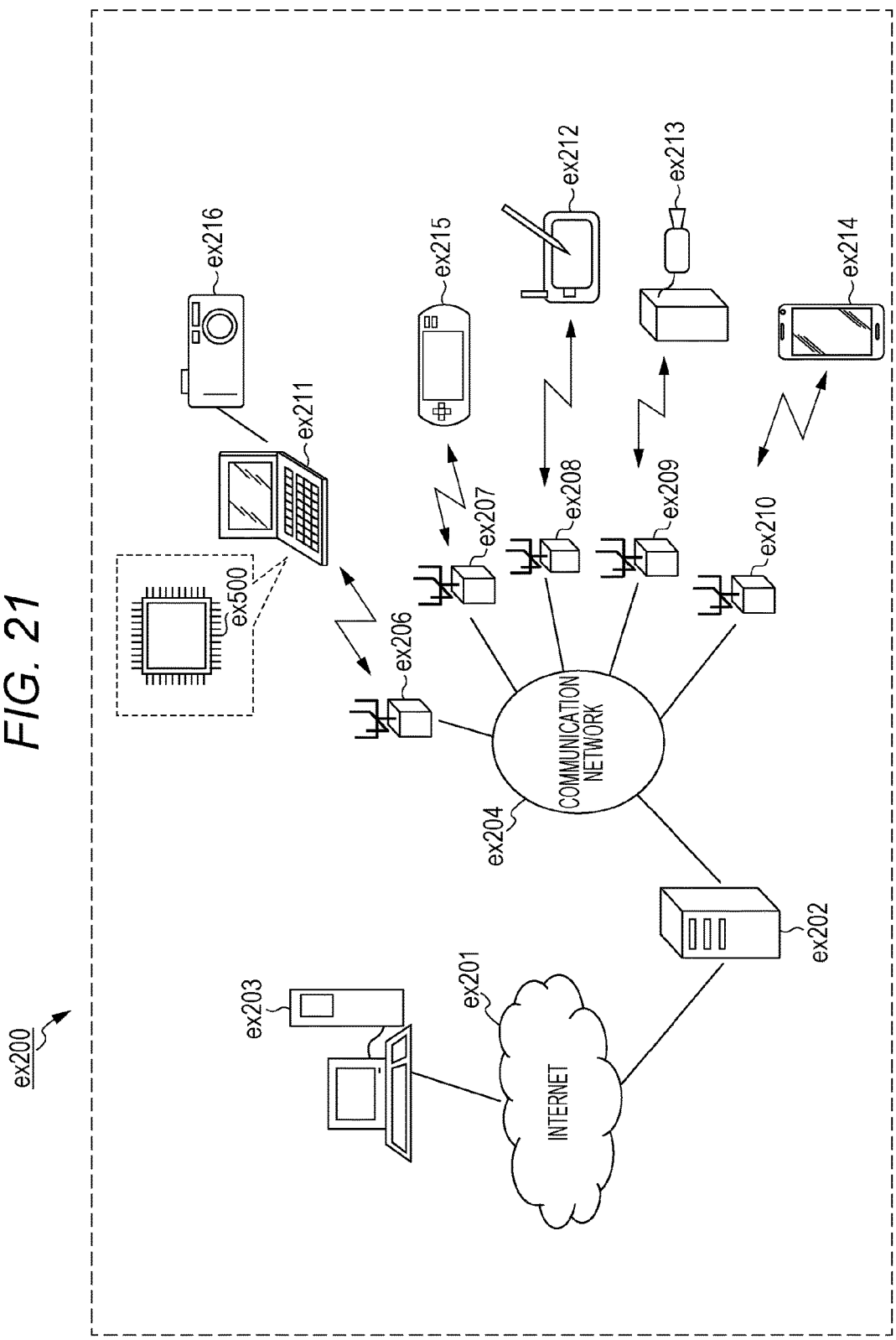
FIG. 21 is an overall configuration diagram of a content providing system that implements content distribution services.

FIG. 21 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 19, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may be formed as a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 22:
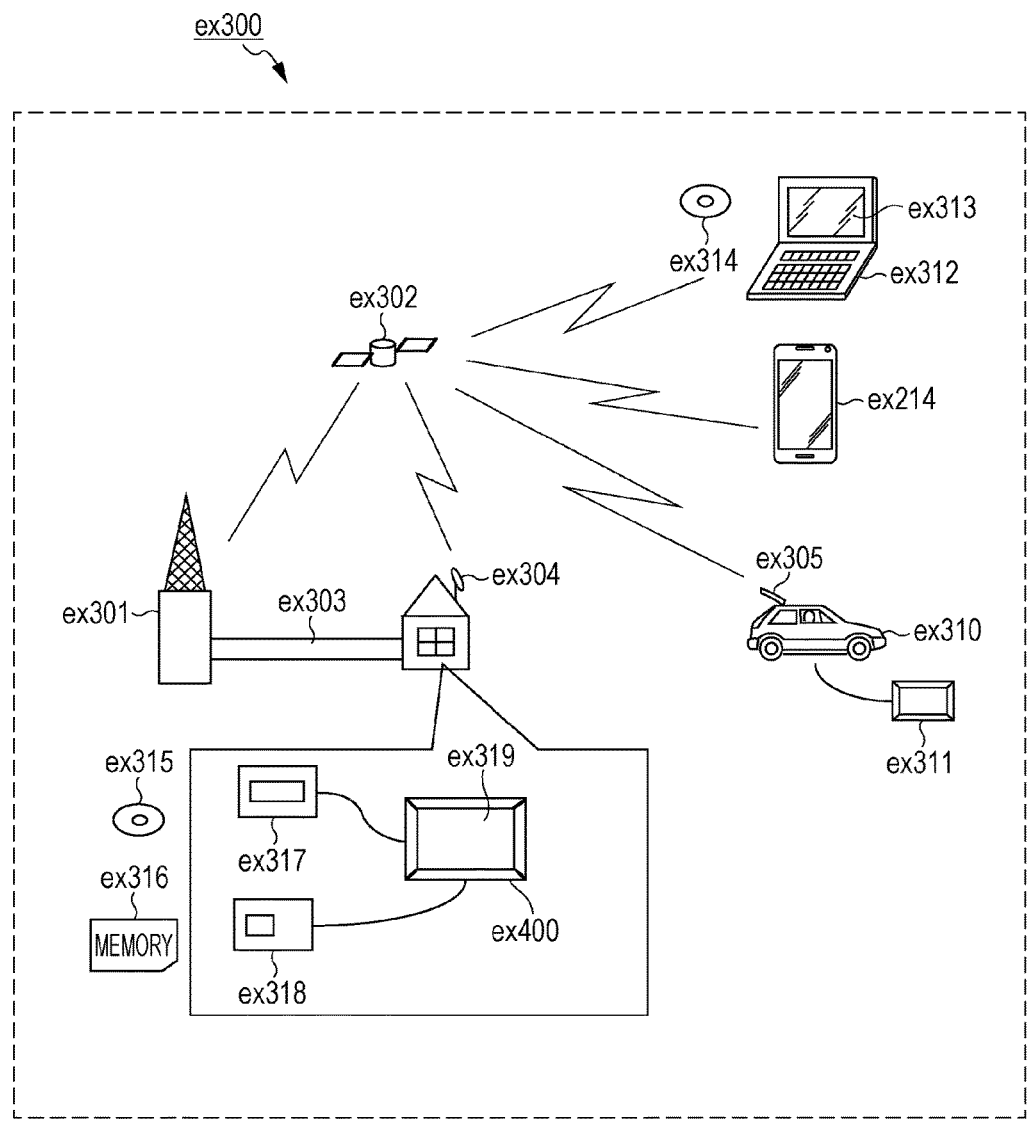
FIG. 22 is an overall configuration diagram of a digital broadcasting system.

Note that in addition to the example of content providing system ex200, each of the above-described exemplary embodiments may also be applied to digital broadcasting system ex300, as illustrated in FIG. 22. Specifically, broadcasting station ex301 transmits a radio wave of multiplexed data obtained by multiplexing video data with music data or the like via communication to broadcasting satellite ex302. This video data is data coded by the moving image coding method described in each of the above-described exemplary embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described exemplary embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 23:
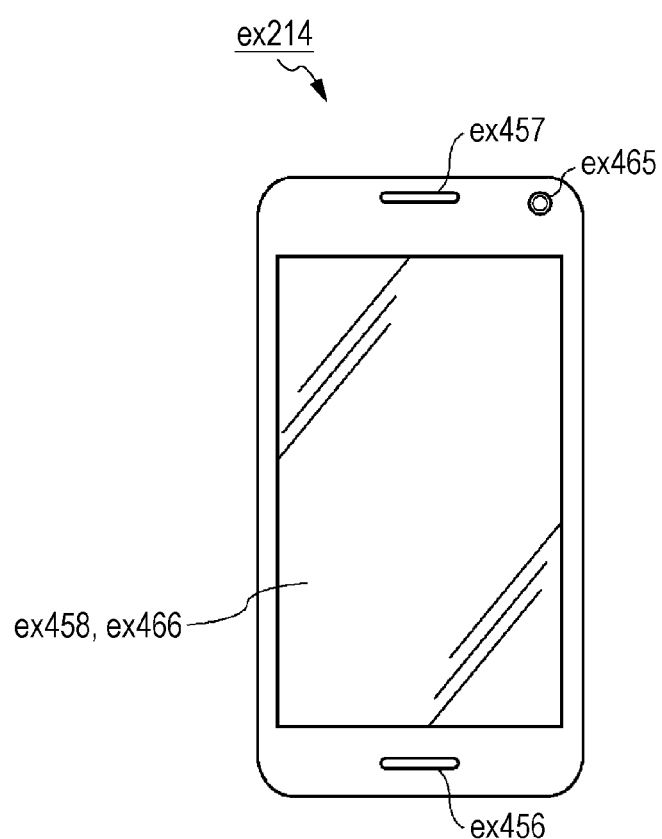
FIG. 23 is a diagram illustrating an example of a smartphone.
Figure 24:
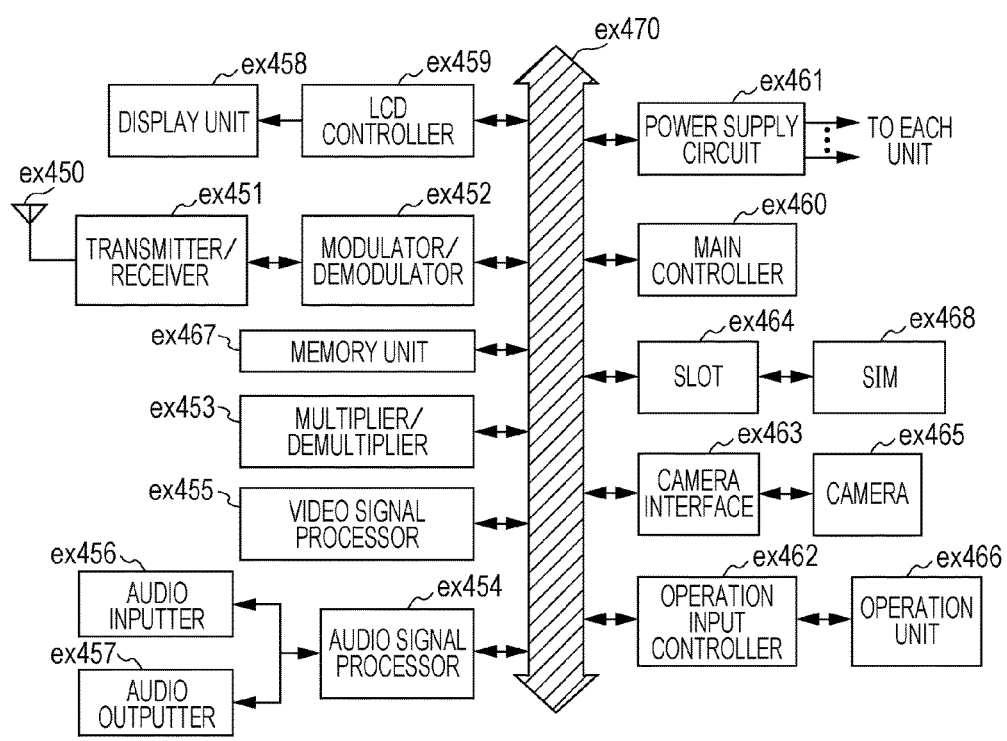
FIG. 24 is a block diagram illustrating a configuration example of a smartphone.

FIG. 23 is a diagram illustrating smartphone ex214. Moreover, FIG. 24 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 22, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above exemplary embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above exemplary embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

Moreover, the present disclosure is not limited to the above-described exemplary embodiments, and various variations or modifications can be made without departing from the scope of the present disclosure.

The present disclosure can be applied to the image photographing method and the image photographing device. The present disclosure can also be applied to information display devices or imaging devices, such as a television, a digital video recorder, a drive recorder, a mobile phone, a smartphone, a digital camera, a monitoring camera, and a digital video camera, which include the image photographing function.

What is claimed is:

1. An image photographing method comprising:
    acquiring a shared image that is (i) one of a plurality of images obtained by photographing an identical subject with a plurality of cameras or (ii) an image generated from the plurality of images, the plurality of cameras being located at a plurality of positions; and
    sharing the shared image between a plurality of users of the plurality of cameras,
    wherein the sharing includes,
    judging whether a target camera that is one of the plurality of cameras photographs the subject,
    when the target camera is judged to photograph the subject, allowing a user of the target camera to browse the shared image according to a period in which the target camera photographs the subject, and
    when the target camera is judged to not photograph the subject, limiting an ability of a user of the target camera to browse the shared image.

2. The image photographing method according to claim 1, wherein the sharing includes judging the period in which the target camera photographs the subject, and
    wherein in the allowing, the user of the target camera is allowed to browse, in a browsing period which is different from the period, the shared image acquired in the period.

3. The image photographing method according to claim 1, wherein the sharing includes judging a period in which the target camera photographs the subject, and
    wherein in the allowing, the user of the target camera is allowed to browse the shared image in the period in which the judging judges that the target camera photographs the subject.

4. The image photographing method according to claim 1, wherein, in the judging, whether the target camera photographs the subject is judged based on positional information about the target camera and based on whether the subject is taken in the image photographed with the target camera.

5. The image photographing method according to claim 1, further comprising:
    authenticating participation of a new user in a session for sharing the shared image;
    performing an event in which the new user is detectable with a camera of an already-participated user who already participates in the session; and
    estimating a position of the new user based on a position of the already-participated user and the event detected with the camera of the already-participated user.

6. The image photographing method according to claim 5, wherein the event is flash light emitted with a camera of the new user.

7. The image photographing method according to claim 5, wherein the event is specific action performed by the new user.

8. The image photographing method according to claim 1, further comprising:
    generating a session with a first camera in order to share the shared image;
    sending a session information about the session from the first camera to a server; and
    sending the session information from the server to a second camera.

9. The image photographing method according to claim 8, wherein, in the sending the session information from the server to the second camera, the server extracts the second camera located near the first camera from a plurality of cameras.

10. An image photographing system comprising:
    a processor; and
    a memory having a computer program stored thereon, the computer program causing the processor to execute operations including:
    acquiring a shared image, which is (i) one of a plurality of images obtained by photographing an identical subject with a plurality of cameras or (ii) an image generated from the plurality of images, the plurality of cameras being located at a plurality of positions; and
    sharing the shared image between a plurality of users of the plurality of cameras,
    wherein the sharing includes,
    judging whether a target camera, that is one of the plurality of cameras, photographs the subject,
    when the target camera is judged to photograph the subject, allowing a user of the target camera to browse the shared image according to a period in which the target camera photographs the subject, and
    when the target camera is judged to not photograph the subject, limiting an ability of a user of the target camera to browse the shared image.

11. A server comprising:
    a processor; and
    a memory having a computer program stored thereon, the computer program causing the processor to execute operations including:
    acquiring a shared image, which is (i) one of a plurality of images obtained by photographing an identical subject with a plurality of cameras or (ii) an image generated from the plurality of images, the plurality of cameras being located at a plurality of positions; and
    sharing the shared image between a plurality of users of the plurality of cameras,
    wherein the sharing includes,
    judging whether a target camera, that is one of the plurality of cameras, photographs the subject,
    when the target camera is judged to photograph the subject, allowing a user of the target camera to browse the shared image according to a period in which the target camera photographs the subject, and
    when the target camera is judged to not photograph the subject, limiting an ability of a user of the target camera to browse the shared image.

12. An image photographing device included in an image photographing system, the image photographing system shares a shared image, which is one of a plurality of images obtained by photographing an identical subject with a plurality of cameras or an image generated from the plurality of images, the plurality of cameras being located at a plurality of positions, the shared image being shared between a plurality of users of the plurality of cameras, the image photographing device comprising:
 a target camera that is one of the plurality of cameras;
 a display that displays the shared image;
 a storage in which the shared image is at least temporarily stored;
 a processor; and
 a memory having a computer program stored thereon, the computer program causing the processor to execute operations including:
 when the target camera is judged to photograph the subject, externally receiving the shared image only in a browsing allowable period of the shared image, the browsing allowable period being set according to the period in which the target camera photographs the subject, and storing the received shared image in the storage, and
 when the target camera is judged to not photograph the subject, not externally receiving the shared image.

13. A non-transitory recording medium having a computer program stored thereon, the computer program causing a processor to execute operations comprising:
 acquiring a shared image, which is (i) one of a plurality of images obtained by photographing an identical subject with a plurality of cameras or (ii) an image generated from the plurality of images, the plurality of cameras being located at a plurality of positions; and
 sharing the shared image between a plurality of users of the plurality of cameras,
 wherein the sharing includes,
 judging whether a target camera, that is one of the plurality of cameras, photographs the subject, and when the target camera is judged to photograph the subject, allowing a user of the target camera to browse the shared image according to a period in which the target camera photographs the subject, and
 when the target camera is judged to not photograph the subject, limiting an ability of a user of the target camera to browse the shared image.

14. The image photographing system according to claim 10,
 wherein the sharing includes judging the period in which the target camera photographs the subject, and
 wherein in the allowing, the user of the target camera is allowed to browse, in a browsing period which is different from the period, the shared image acquired in the period.

15. The image photographing system according to claim 10,
 wherein the sharing includes judging a period in which the target camera photographs the subject, and
 wherein in the allowing, the user of the target camera is allowed to browse the shared image in the period in which the judging judges that the target camera photographs the subject.

16. The image photographing system according to claim 10,
 wherein, in the judging, whether the target camera photographs the subject is judged based on positional information about the target camera and based on whether the subject is taken in the image photographed with the target camera.

17. The image photographing system according to claim 10, further comprising:
 authenticating participation of a new user in a session for sharing the shared image;
 performing an event in which the new user is detectable with a camera of an already-participated user who already participates in the session; and
 estimating a position of the new user based on a position of the already-participated user and the event detected with the camera of the already-participated user.

18. The server according to claim 11, further comprising:
 authenticating participation of a new user in a session for sharing the shared image;
 performing an event in which the new user is detectable with a camera of an already-participated user who already participates in the session; and
 estimating a position of the new user based on a position of the already-participated user and the event detected with the camera of the already-participated user.

19. The image photographing device according to claim 12, further comprising:
 authenticating participation of a new user in a session for sharing the shared image;
 performing an event in which the new user is detectable with a camera of an already-participated user who already participates in the session; and
 estimating a position of the new user based on a position of the already-participated user and the event detected with the camera of the already-participated user.

20. The non-transitory recording medium according to claim 13, further comprising:
 authenticating participation of a new user in a session for sharing the shared image;
 performing an event in which the new user is detectable with a camera of an already-participated user who already participates in the session; and
 estimating a position of the new user based on a position of the already-participated user and the event detected with the camera of the already-participated user.

* * * * *